United States Patent
Naruse et al.

(10) Patent No.: US 8,974,895 B2
(45) Date of Patent: Mar. 10, 2015

(54) INKJET INK, INK STORAGE CONTAINER, INKJET RECORDING DEVICE, AND RECORDED MATTER

(71) Applicants: Mitsuru Naruse, Shizuoka (JP); Masayasu Nonogaki, Shizuoka (JP); Keita Katoh, Shizuoka (JP); Akihiko Matsuyama, Shizuoka (JP); Kazukiyo Nagai, Shizuoka (JP); Yuusuke Koizuka, Shizuoka (JP)

(72) Inventors: Mitsuru Naruse, Shizuoka (JP); Masayasu Nonogaki, Shizuoka (JP); Keita Katoh, Shizuoka (JP); Akihiko Matsuyama, Shizuoka (JP); Kazukiyo Nagai, Shizuoka (JP); Yuusuke Koizuka, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/183,677

(22) Filed: Feb. 19, 2014

(65) Prior Publication Data
US 2014/0242352 A1    Aug. 28, 2014

(30) Foreign Application Priority Data

Feb. 27, 2013 (JP) ................. 2013-037165
Aug. 22, 2013 (JP) ................. 2013-171933

(51) Int. Cl.
*C09D 11/10* (2014.01)
*C09D 11/30* (2014.01)
*C09D 11/326* (2014.01)

(52) U.S. Cl.
CPC .............. *C09D 11/30* (2013.01); *C09D 11/326* (2013.01)
USPC ......... 428/195.1; 524/547; 523/160; 347/100

(58) Field of Classification Search
CPC .... C09D 11/30; C09D 11/322; C09D 11/326; C08F 230/02; C08L 43/02
USPC ....................................... 524/547
See application file for complete search history.

(56) References Cited

U.S. PATENT DOCUMENTS

2012/0242741 A1  9/2012  Hasegawa et al.
2012/0328854 A1  12/2012  Matsuyama et al.

FOREIGN PATENT DOCUMENTS

| JP | 2003-020427 | 1/2003 |
| JP | 2006-342201 | 12/2006 |
| JP | 2008-214530 | 9/2008 |
| JP | 2010-095693 | 4/2010 |
| JP | 2011-122072 | 6/2011 |

*Primary Examiner* — Vu A Nguyen
(74) *Attorney, Agent, or Firm* — Cooper & Dunham LLP

(57) ABSTRACT

An inkjet ink that contains at least water; a water-soluble organic solvent; a pigment; and a copolymer or a salt thereof. The copolymer or the salt thereof has at least a structural unit represented by Formula 1, a structural unit represented by Formula 2, and a structural unit represented by Formula 3 or 4.

7 Claims, 4 Drawing Sheets

INKJET INK, INK STORAGE CONTAINER, INKJET RECORDING DEVICE, AND RECORDED MATTER

CROSS-REFERENCE TO RELATED APPLICATIONS

This patent application is based on and claims priority pursuant to 35 U.S.C. §119 to Japanese Patent Application Nos. 2013-037165 and 2013-171933, filed on Feb. 27, 2013 and Aug. 22, 2013, respectively, in the Japan Patent Office, the entire disclosures of which are hereby incorporated by reference herein.

BACKGROUND

1. Technical Field

The present invention relates to an inkjet ink, an ink storage container, an inkjet recording apparatus, and recorded matter.

2. Background Art

In recent years, inkjet recording apparatuses have been widely used as image-forming apparatuses because the image-forming process is simple, full-color recording can be easily achieved, and high-resolution images can be obtained even with a simple structure.

Inkjet recording apparatuses are apparatuses for forming an image by ejecting an ink by using pressure generated by a bubble formed by heat, a piezoelectric effect, an electrostatic effect, or the like to allow the ejected ink to adhere to a recording medium. Inkjet recording apparatuses have been increasingly used as personal and industrial printers and in printing.

Pigment inks have recently been studied for in inkjet recording apparatuses.

Pigment inks have a problem in terms of insufficient storage stability.

JP-2006-342201-A discloses an inkjet ink containing water, a water-soluble organic solvent, a pigment, and a polymer dispersant for dispersing the pigment, the polymer dispersant having a weight-average molecular weight of 800 or more. In this inkjet ink, a characteristic value represented by (ratio of polymer dispersant to pigment in ink after centrifugal treatment for removing sediment (conditions for centrifugal treatment: centrifugal acceleration 9,000 g×30 min))/(ratio of polymer dispersant to pigment in ink before centrifugal treatment) is 1.0 to 1.5.

However, it is difficult to achieve both a high image density on plain paper and high storage stability.

JP-2011-122072-A neither exemplifies a copolymer obtained by using compounds represented by Formulae 5 to 8 in the present invention nor describes an effect of improving the image density on plain paper having a low content of a water-soluble polyvalent metal salt or an effect of improving dispersion stability of a pigment.

JP-2008-214530-A also neither exemplifies a copolymer obtained by using compounds represented by Formulae 5 to 8 in the present invention nor describes an effect of improving the image density.

SUMMARY

The present invention provides an improved inkjet ink that contains at least water; a water-soluble organic solvent; a pigment; and a copolymer or a salt thereof. The copolymer or the salt thereof has at least a structural unit represented by Formula 1, a structural unit represented by Formula 2, and a structural unit represented by Formula 3 or 4.

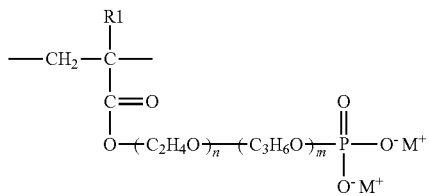
(Formula 1)

In Formula 1, R1 represents a methyl group or a hydrogen atom, $M^+$s each represent a hydrogen ion, an alkali metal ion, or an organic ammonium ion, and m and n each, independently represent 0 or an integer of from 1 to 6 excluding a case of both m and n being 0 at the same time.

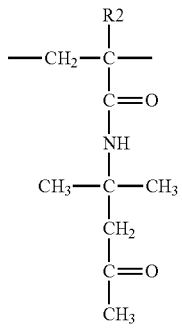
(Formula 2)

In Formula 2, R2 represents a methyl group or a hydrogen atom.

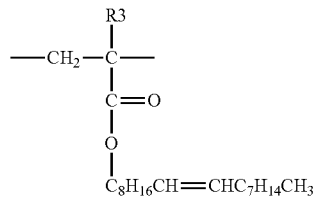
(Formula 3)

In Formula 3, R3 represents a methyl group or a hydrogen atom.

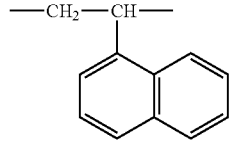
(Formula 4)

BRIEF DESCRIPTION OF THE DRAWINGS

Various other objects, features and attendant advantages of the present invention will be more fully appreciated as the same become better understood from the detailed description when considered in connection with the accompanying drawings, in which like reference characters designate like corresponding parts throughout and wherein.

DETAILED DESCRIPTION

Figure 1:
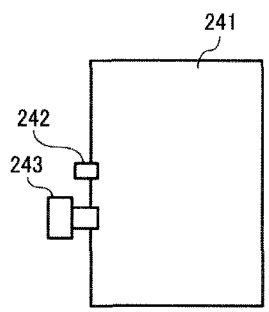
FIG. 1 is a schematic plan view illustrating an ink storage container according to an embodiment of the present invention.

An object of the present invention is to provide an inkjet ink having a high image density on plain paper and high storage stability.

As a result of investigations, the inventors of the present invention found that the object can be achieved by using, as a component of an inkjet ink, a copolymer having particular structural units or a salt of the copolymer. This finding led to the realization of the present invention.

An inkjet ink according to an embodiment of the present invention will now be described.

An inkjet ink according to an embodiment of the present invention contains at least water, a water-soluble organic solvent, a pigment, and a copolymer or a salt thereof. The copolymer or the salt thereof has a structural unit represented by Formula 1 below, a structural unit represented by Formula 2 below, and a structural unit represented by Formula 3 or 4 below.

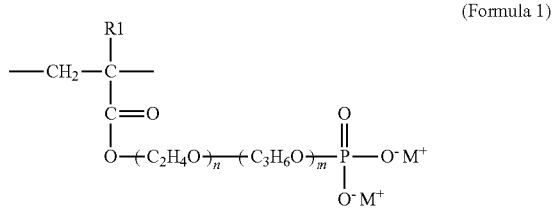
(Formula 1)

In Formula 1, R1 represents a methyl group or a hydrogen atom, $M^+$s each represent a hydrogen ion, an alkali metal ion, or an organic ammonium ion, and m and n each, independently represent 0 or an integer of from 1 to 6 excluding a case of both m and n being 0 at the same time.

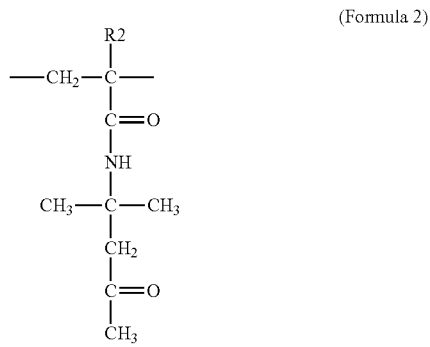
(Formula 2)

In Formula 2, R2 represents a methyl group or a hydrogen atom.

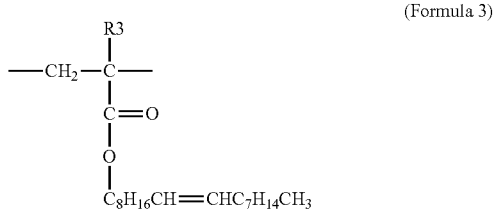
(Formula 3)

In Formula 3, R3 represents a methyl group or a hydrogen atom.

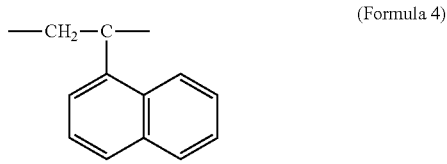
(Formula 4)

Examples of the water that can be used include pure water and extra-pure water, such as ion-exchange water, ultra-filtered water, reverse osmosis water, and distilled water.

The copolymer is obtained by copolymerizing monomers containing a compound represented by Formula 5 below, a compound represented by Formula 6 below, and a compound represented by Formula 7 or 8 below. The salt of the copolymer can be synthesized by preparing the copolymer, and subsequently neutralizing the copolymer with an alkali metal base or an organic amine base. In this case, the copolymer and the salt thereof are usually a water-soluble resin or a water-dispersible resin.

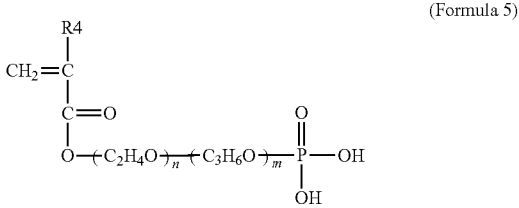
(Formula 5)

In Formula 5, R4 represents a methyl group or a hydrogen atom, and m and n each, independently represent 0 or an integer of from 1 to 6 excluding a case of both m and n being 0 at the same time.

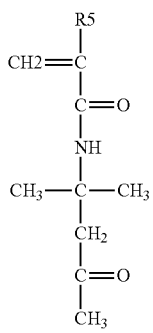
(Formula 6)

In Formula 6, R5 represents a methyl group or a hydrogen atom.

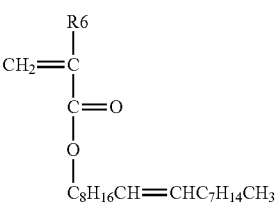
(Formula 7)

In Formula 7, R6 represents a methyl group or a hydrogen atom.

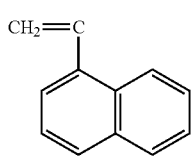
(Formula 8)

A method for copolymerizing the monomers is not particularly limited. For example, the monomers are copolymerized in a flask equipped with a stirrer, a thermometer, and a nitrogen-introducing tube in the presence of a solvent and a polymerization initiator at a temperature of 60° C. to 150° C. while flowing nitrogen gas.

The molecular weight of the copolymer can be controlled by adjusting the monomer concentrations during polymerization and/or the amount of polymerization initiator.

Specific examples of the compound represented by Formula 5 include, but are not limited to, the following:

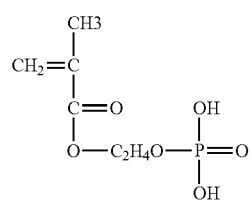
(Formula 5-1)

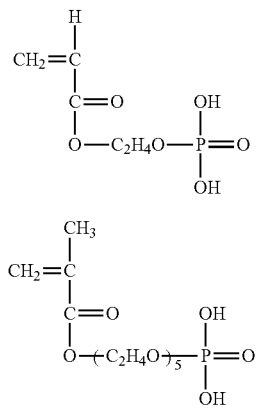
(Formula 5-2)

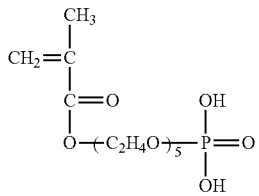
(Formula 5-3)

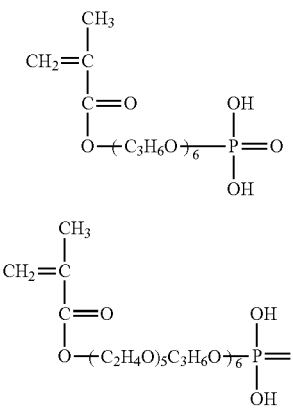
(Formula 5-4)

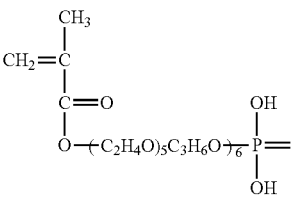
(Formula 5-5)

Specific examples of commercially available products of the compound represented by Formula 5-1 include, but are not limited to, Light Ester P-1M (manufactured by Kyoeisha Chemical Co., Ltd.) and Phosmer M (manufactured by Uni-Chemical Co., Ltd.). Specific examples of commercially available products of the compound represented by Formula 5-2 include, but are not limited to, Light Acrylate P-1A (manufactured by Kyoeisha Chemical Co., Ltd.). Specific examples of commercially available products of the compounds represented by Formulae 5-3 to 5-5 include, but are not limited to, Phosmer PE (manufactured by Uni-Chemical Co., Ltd.) and Phosmer PP (manufactured by Uni-Chemical Co., Ltd.).

The inkjet ink according to an embodiment of the present invention preferably contains a salt of a copolymer. When the copolymer is neutralized with an alkali metal base or an organic amine base, a neutralization ratio is more preferably 50% to 100%.

Specific examples of the alkali metal ion represented by $M^+$ in Formula 1 include, but are not particularly limited to, $Li^+$, $Na^+$, and $K^+$.

Specific examples of the organic ammonium ion represented by $M^+$ in Formula include, but are not limited to, alkyl ammonium ions such as monomethylammonium ion, dimethylammonium ion, trimethylammonium ion, monoethylammonium ion, diethylammonium ion, and triethylammonium ion; alcohol ammonium ions such as monoethanolammonium ion, diethanolammonium ion, triethanolammonium ion, methylethanolammonium ion, methyldiethanolammonium ion, dimethylethanolammonium ion, monopropanolammonium ion, dipropanolammonium ion, tripropanolammonium ion, isopropanolammonium ion, 1,1- bis(hydroxymethyl)-2-hydroxyethylammonium ion, and 1,1-bis(hydroxymethyl)propylammonium ion; and ammonium ions derived from cyclic amines such as cholinium ion, morpholinium ion, N-methylmorpholinium ion, N-methyl-2-pyrrolidonium ion, and 2-pyrrolidonium ion.

The compound represented by Formula 6 is diacetone acrylamide or diacetone methacrylamide, and is represented by formulae below.

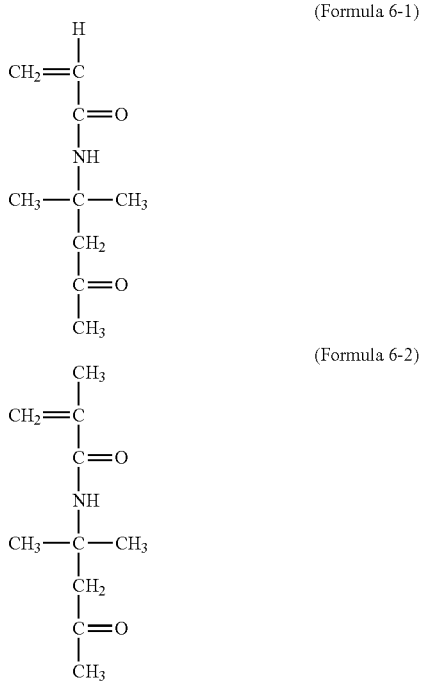

(Formula 6-1)

(Formula 6-2)

The compound represented by Formula 7 is oleyl methacrylate or oleyl acrylate, and is represented by formulae below.

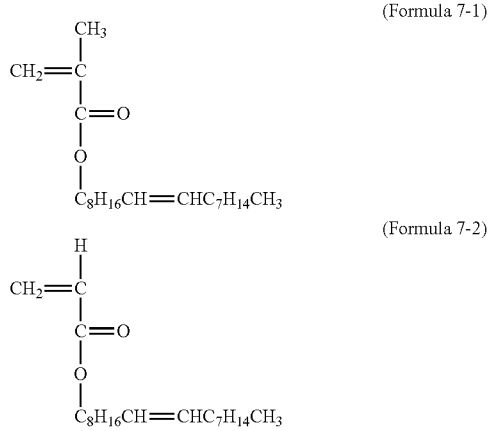

(Formula 7-1)

(Formula 7-2)

The compound represented by Formula 7 is obtained by a dehydration reaction between acrylic acid or methacrylic acid and oleyl alcohol.

The content of the structural unit represented by Formula 1 of the copolymer or a salt thereof is preferably 5% to 80% by mass, and more preferably 10% to 60% by mass. In such a case, a high image density of the inkjet ink on plain paper and high storage stability of the inkjet ink can be realized.

The content of the structural unit represented by Formula 3 of the copolymer or a salt thereof is preferably 5% to 90% by mass, and more preferably 10% to 80% by mass. In such a case, a high image density of the inkjet ink on plain paper and high storage stability of the inkjet ink can be realized.

The content of the structural unit represented by Formula 2 of the copolymer or a salt thereof is determined by a ratio of the structural unit represented by Formula 1 to the structural unit represented by Formula 3 of the copolymer or a salt thereof. The content of the structural unit represented by Formula 2 is designed in the range of 5% to 90% by mass.

The weight-average molecular weight of the copolymer before being neutralized with an alkali metal base or an organic amine base is usually 3,000 to 60,000, preferably 5,000 to 50,000, and more preferably 6,000 to 30,000. In such a case, a high image density of the inkjet ink on plain paper and high storage stability of the inkjet ink can be realized.

The content of the copolymer or a salt thereof in the inkjet ink is usually 0.05% to 10% by mass, preferably 0.5% to 5% by mass, and more preferably 1% to 3% by mass. When the content of the copolymer or a salt thereof in the inkjet ink is 0.05% by mass or more, the image density on plain paper can be improved. When the content of the copolymer or a salt thereof in the inkjet ink is 10% by mass or less, ejection stability of the inkjet ink can be improved.

A mass ratio of the copolymer or a salt thereof to the pigment is usually 0.01 to 1, preferably 0.05 to 0.8, and more preferably 0.1 to 0.5. When the mass ratio of the copolymer or a salt thereof to the pigment is 0.01 or more, the storage stability of the inkjet ink can be improved. When the mass ratio of the copolymer or a salt thereof to the pigment is 1 or less, the image density on plain paper can be improved.

Specific examples of the water-soluble organic solvent include, but are not particularly limited to, polyhydric alcohols such as glycerin, ethylene glycol, diethylene glycol, isopropylidene glycerol, 1,3-butanediol, 3-methyl-1,3-butanediol, triethylene glycol, propylene glycol, dipropylene glycol, trimethylolpropane, trimethylolethane, ethylene glycol, diethylene glycol, dipropylene glycol, dipropylene glycol, tetraethylene glycol, hexylene glycol, polyethylene glycol, polypropylene glycol, 1,5-pentanediol, 1,6-hexanediol, 1,2,6-hexanetriol, 1,2,4-butanetriol, 1,2,3-butanetriol, and petriol; polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyhydric alcohol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1.3-dimethylimidazolidinone, $\epsilon$-caprolactam, and $\gamma$-butyrolactone; amides such as formamide, N-methylformamide, N,N-dimethylformamide, N,N-dimethyl-$\beta$-methoxypropionamide, and N,N-dimethyl-$\beta$-butoxypropionamide; amines such as monoethanolamine, diethanolamine, triethanolamine, monoethylamine, diethylamine, and triethylamine; sulfur-containing compounds such as dimethyl sulfoxide, sulfolane, and thiodiethanol; 3-ethyl-3-hydroxymethyloxetane, propylene carbonate, ethylene carbonate, polyols having 8 to 11 carbon atoms, glycol ethers having 8 to 11 carbon atoms, and lower alcohols. These water-soluble organic solvents may be used in combination of two or more thereof.

Among these water-soluble organic solvents, from the viewpoint of wettability of the inkjet ink, preferable examples of the water-soluble organic solvent include polyhydric alcohols such as glycerin, ethylene glycol, diethylene glycol, isopropylidene glycerol, 1,3-butanediol, 3-methyl-1,3-butanediol, triethylene glycol, propylene glycol, dipropylene glycol, trimethylolpropane, trimethylolethane, ethylene glycol, diethylene glycol, dipropylene glycol, tripropylene glycol, tetraethylene glycol, hexylene glycol, polyethylene glycol, polypropylene glycol, 1,5-pentanediol, 1,6-hexanediol, 1,2,6-hexanetriol, 1,2,4-butanetriol, 1,2,3-butanetriol, and petriol; polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyhydric alcohol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethylimidazolidinone, ε-caprolactam, and γ-butyrolactone; amides such as formamide, N-methylformamide, N,N-dimethylformamide, N,N-dimethyl-β-methoxypropionamide, and N,N-dimethyl-β-butoxypropionamide; amines such as monoethanolamine, diethanolamine, triethanolamine, monoethylamine, diethylamine, and triethylamine; sulfur-containing compounds such as dimethyl sulfoxide, sulfolane, and thiodiethanol; 3-ethyl-3-hydroxymethyloxetane, propylene carbonate, and ethylene carbonate. More preferable examples of the water-soluble organic solvent include 1,3-Butanediol, diethylene glycol, 2,2,4-dimethyl-1,3-pentanediol, triethylene glycol, and glycerin.

The term "wettability" refers to a property of an inkjet ink of retaining water, which prevents the inkjet ink from drying out. A component of the inkjet ink having wettability is simply referred to as a "humectant".

The content of the humectant in the inkjet ink is usually 10% to 60% by mass, and preferably 20% to 50% by mass. When the content of the humectant in the inkjet ink is 10% by mass or more, ejection stability of the inkjet ink can be improved. When the content of the humectant in the inkjet ink is 60% by mass or less, a drying property of the inkjet ink can be improved.

Among the above water-soluble organic solvents, from the viewpoint of penetrability of the inkjet ink, polyols having 8 to 11 carbon atoms, glycol ethers having 8 to 11 carbon atoms, and lower alcohols are preferable. 2-Ethyl-1,3-hexanediol (solubility: 4.2% by mass) and 2,2,4-ttimethyl-1,3-pentanediol (solubility: 2.0% by mass) are more preferable.

Specific examples of the polyols having 8 to 11 carbon atoms include, but are not limited to, 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, and 5-hexene-1,2-diol.

Specific examples of the glycol ethers having 8 to 11 carbon atoms include, but are not limited to, diethylene glycol monophenyl ether, ethylene glycol monophenyl ether, ethylene glycol monoaryl ether, diethylene glycol monobutyl ether, propylene glycol monobutyl ether, and tetraethylene glycol chlorophenyl ether.

Specific examples of the lower alcohols include, but are not limited to, ethanol.

The term "penetrability" refers to a property indicating how readily an inkjet ink penetrates into a recording medium. A component of the inkjet ink having penetrability is simply referred to as a "penetrant".

The content of the penetrant in the inkjet ink is usually 0.1% to 4% by mass. When the content of the penetrant in the inkjet ink is 0.1% by mass or more, bleeding of an image can be suppressed. When the content of the penetrant in the inkjet ink is 4% by mass or less, ejection stability of the inkjet ink can be improved and the image density can be improved.

The inkjet ink may further contain a humectant other than the water-soluble organic solvent.

Specific examples of the humectant other than the water-soluble organic solvent include, but are not particularly limited to, sugars and derivatives thereof. There substances may be used in combination of two or more thereof.

Specific examples of the sugars include, but are not particularly limited to, monosaccharides such as glucose, mannose, fructose, ribose, xylose, arabinose, and galactose; disaccharides such as maltose, cellobiose, lactose, sucrose, and trehalose; oligosaccharides such as maltotriose; and polysaccharides such as a-cyclodextrin and cellulose.

Specific examples of the derivatives of sugars include, but are not limited to, reducing sugars such as sugar alcohols, e.g., D-sorbitol, sorbitan, maltitol, erythritol, lactitol, and xylitol; oxidized sugars such as aldonic acid and uronic acid; amino acids, and thio acids. Among these, sugar alcohols are preferable.

The pigment is not particularly limited. Examples of the pigment include, but are not limited to, inorganic pigments and organic pigments. These pigments may be used in combination of two or more thereof.

Specific examples of the inorganic pigments include, but are not limited to, titanium oxide, iron oxide, calcium carbonate, barium sulfate, aluminum hydroxide, barium yellow, prussian blue, cadmium red, chromium yellow, metal powders, and carbon black. Among these inorganic pigments, carbon black is preferable.

Specific examples of a method for producing carbon black include, but are not particularly limited to, a contact process, a furnace process, and a thermal process.

Specific examples of the organic pigments include, but are not limited to, azo pigments, azomethine pigments, polycyclic pigments, dye chelates, nitro pigments, nitroso pigments, and aniline black. Among these organic pigments, azo pigments and polycyclic pigments are preferable.

Specific examples of the azo pigments include, but are not limited to, azo lake, insoluble azo pigments, condensation azo pigments, and chelate azo pigments.

Specific examples of the polycyclic pigments include, but are not limited to, phthalocyanine pigments, perylene pigments, perinone pigments, anthraquinone pigments, quinacridone pigments, dioxazine pigments, indigo pigments, thioindigo pigments, isoindolinone pigments, quinophthalone pigments, and rhodamine B lake pigment.

Specific examples of the dye chelates include, but are not limited to, basic dye chelates and acidic dye chelates.

Specific examples of the pigment for black include, but are not limited to, carbon blacks (C. I. Pigment Black 7) such as furnace black, lamp black, acetylene black, and channel black; metal oxides such as copper oxides, iron oxides (C. I. Pigment Black 11), and titanium oxide; and organic pigments such as aniline black (C. I. Pigment Black 1).

The carbon black is preferably produced by a furnace process or a channel process, and preferably has a primary particle size of 15 to 40 nm, a BET specific surface area of 50 to 300 m²/g, a dibutyl phthalate (DBP) oil absorption amount of 40 to 150 mL/100 g, a volatile content of 0.5% to 10% by mass, and a pH of 2 to 9.

Specific examples of commercially available carbon blacks include, but are not limited to, No. 2300, No. 900, MCF-88, No. 33, No. 40, No. 45, No. 52, MA7, MA8, MA100, and No. 2200B (all of which are manufactured by Mitsubishi Chemical Corporation); Raven 700, 5750, 5250, 5000, 3500, and 1255 (all of which are manufactured by Columbian Chemicals Company); Regal 400R, 330R, 660R, Mogul L, Monarch 700, 800, 880, 900, 1000, 1100, 1300, and Monarch 1400 (all of which are manufactured by Cabot Corporation); Color Black FW1, FW2, FW2V, FW18, FW200, 5150, 5160, and S170, Printex 35, U, V, 140U, and 140V, and Special Black 6, 5, 4A, and 4 (all of which are manufactured by Degussa).

Specific examples of the pigment for yellow include, but are not limited to, C. I. Pigment Yellow 1, C. I. Pigment Yellow 2, C. I. Pigment Yellow 3, C. I. Pigment Yellow 12, C. I. Pigment Yellow 13, C. I. Pigment Yellow 14, C. I. Pigment Yellow 16, C. I. Pigment Yellow 17, C. I. Pigment Yellow 73, C. I. Pigment Yellow 74, C. I. Pigment Yellow 75, C. I. Pigment Yellow 83, C. I. Pigment Yellow 93, C. I. Pigment Yellow 95, C. I. Pigment Yellow 97, C. I. Pigment Yellow 98, C. I. Pigment Yellow 114, C. I. Pigment Yellow 120, C. I. Pigment Yellow 128, C. I. Pigment Yellow 129, C. I. Pigment Yellow 138, C. I. Pigment Yellow 150, C. I. Pigment Yellow 151, C. I. Pigment Yellow 154, C. I. Pigment Yellow 155, C. I. Pigment Yellow 174, and C. I. Pigment Yellow 180.

Specific examples of the pigment for magenta include, but are not limited to, C. I. Pigment Red 5, C. I. Pigment Red 7, C. I. Pigment Red 12, C. I. Pigment Red 48 (Ca), C. I. Pigment Red 48 (Mn), C. I. Pigment Red 57 (Ca), C. I. Pigment Red 57:1, C. I. Pigment Red 112, C. I. Pigment Red 122, C. I. Pigment Red 123, C. I. Pigment Red 146, C. I. Pigment Red 168, C. I. Pigment Red 176, C. I. Pigment Red 184, C. I. Pigment Red 185, C. I. Pigment Red 202, and Pigment Violet 19.

Specific examples of the pigment for cyan include, but are not limited to, C. I. Pigment Blue I, C. I. Pigment Blue 2, C.I. Pigment Blue 3, C. I. Pigment Blue 15, C. I. Pigment Blue 15:3, C.I. Pigment Blue 15:4, C. I. Pigment Blue 15:34, C. I. Pigment Blue 16, C. I. Pigment Blue 22, C. I. Pigment Blue 60, C. I. Pigment Blue 63, C. I. Pigment Blue 66; C. I. Vat Blue 4, and C. I. Vat Blue 60.

The content of the pigment in the inkjet ink is usually 1% to 20% by mass. When the content of the pigment in the inkjet ink is 1% by mass or more, the image density can be improved. When the content of the pigment in the inkjet ink is 20% by mass or less, ejection stability of the inkjet ink can be improved.

The pigment usually has a volume-average particle size (D50%) of 150 nm or less.

The volume-average particle size of the pigment can be measured by a dynamic light-scattering method in an environment at 23° C. and at 55% RH using a Microtrac UPA (manufactured by Nikkiso Co., Ltd.).

The inkjet ink may further contain a dispersing agent, a penetrant, a pH adjusting agent, a water-dispersible resin, an antiseptic fungicide, a chelating reagent, an anticorrosive, an antioxidant, an UV absorber, an oxygen absorbent, a light stabilizer, and the like.

The dispersing agent is not particularly limited as long as the dispersing agent can promote dispersion of a pigment in the inkjet ink. Examples of the dispersing agent include anionic surfactants, cationic surfactants, amphoteric surfactants, and nonionic surfactants. These surfactants may be used in combination of two or more thereof.

Specific examples of the anionic surfactants include, but are not limited to, alkylsulfocarboxylates, α-olefin sulfonates, polyoxyethylene alkyl ether acetates, N-acyl amino acids and salts thereof, N-acyl methyltaurine salts, polyoxy alkyl ether sulfates, polyoxyethylene alkyl ether phosphates, rosin acid soap, castor oil sulfate, lauryl alcohol sulfate, alkylphenol-type phosphates, naphthalene sulfonate formalin condensate, alkyl-type phosphates, alkyl aryl sulfonates, diethyl sulfosuccinate, diethylhexyl sulfosuccinate, and dioctyl sulfosuccinate.

Specific Examples of the cationic surfactants include, but are not limited to, 2-vinylpyridine derivatives and poly(4-vinylpyridine) derivatives.

Specific examples of the amphoteric surfactants include, but are not limited to, lauryl dimethyl aminoacetic acid betaine, 2-alkyl-N-carboxymethyl-N-hydroxyethyl imidazolinium betaine, coconut oil fatty acid amide propyldimethylaminoacetic acid betaine, polyoctyl potyaminoethyl glycine, and imidazoline derivatives.

Specific examples of the nonionic surfactants include, but are not limited to, ether-based surfactants such as polyoxyethylene nonyl phenyl ether, polyoxyethylene octyl phenyl ether, polyoxyethylene dodecyl phenyl ether, polyoxyethylene lauryl ether, polyoxyethylene oleyl ether, polyoxyethylene alkyl ethers, and polyoxyalkylene alkyl ethers; ester-based surfactants such as polyoxyethylene oleic acid, polyoxyethylene oleate, polyoxyethylene distearate, sorbitan laurate, sorbitan monostearate, sorbitan monooleate, sorbitan sesquioleate, polyoxyethylene monooleate, and polyoxyethylene stearate; and acetylene glycol-based surfactants such as 2,4,7,9-tetramethyl-5-decyn-4,7-diol, 3,6-dimethyl-4-octyn-3,6-diol, and 3,5-dimethyl-1-hexyn-3-ol.

The pH adjusting agent is not particularly limited as long as the pH of the inkjet ink can be adjusted with the pH adjusting agent. Examples of the pH adjusting agent include alcohol amines, hydroxides of alkali metals, ammonium hydroxides, phosphonium hydroxides, and carbonates of alkali metals.

Specific examples of the alcohol amines include, but are not limited to, diethanolamine, triethanolamine, and 2-amino-2-ethyl-1,3-propanediol.

Specific examples of the hydroxides of alkali metals include, but are not limited to, lithium hydroxide, sodium hydroxide, and potassium hydroxide.

Specific examples of the ammonium hydroxides include, but are not limited to, ammonium hydroxide and quaternary ammonium hydroxide.

Specific examples of the phosphonium hydroxides include, but are not limited to, quaternary phosphonium hydroxide.

Specific examples of the carbonates of alkali metals include, but are not limited to, lithium carbonate, sodium carbonate, and potassium carbonate.

Specific examples of the water-dispersible resin include, but are not particularly limited to, condensation-type synthetic resins, addition-type synthetic resins, and naturally-occurring polymer compounds. These water-dispersible resins may be used in combination of two or more thereof.

Specific examples of the condensation-type synthetic resins include, but are not limited to, polyesters, polyurethanes, polyepoxy resins, polyamides, polyethers, poly(meth)acrylic resins, acrylic-silicone resins, and fluororesins.

Specific examples of the addition-type synthetic resins include, but are not limited to, polyolefin resins, polystyrene resins, polyvinyl alcohol resins, polyvinyl ester resins, polyacrylic acid resins, and unsaturated carboxylic acid resins.

Specific Examples of the naturally-occurring polymer compounds include, but are not limited to, celluloses, rosins, and natural rubber.

Among these water-dispersible resins, polyurethanes, acrylic-silicone resins, and fluororesins are preferable.

The antiseptic fungicide is not particularly limited as long as it can suppress propagation of bacteria in the inkjet ink. Examples of the antiseptic fungicide include sodium dehydroacetate, sodium sorbate, 2-pyridinethiol-1-oxide sodium salt, sodium benzoate, and pentachlorophenol sodium salt.

Specific examples of the chelating reagent include, but are not particularly limited to, ethylenediaminetetraacetic acid disodium salt, nitrilotriacetic acid sodium salt, hydroxyethyl ethylenediaminetriacetic acid sodium salt, diethylenetriaminepentaacetic acid sodium salt, and uramil diacetic acid sodium salt.

Specific examples of the anticorrosive include, but are not particularly limited to, acid sulfite, sodium thiosulfate, ammonium thiodiglycolate, diisopropylammonium nitrite, pentaerythritol tetranitrate, and dicyclohexylammonium nitrite.

Specific examples of the antioxidant include, but are not particularly limited to, phenol-based antioxidants (including hindered phenol-based antioxidants), amine-based antioxidants, sulfur-based antioxidants, and phosphorus-based antioxidants.

Specific examples of the UV absorber include, but are not particularly limited to, benzophenone-based UV absorbers, benzotriazole-based UV absorbers, salicylate-based UV absorbers, cyanoacrylate UV absorbers, and nickel complex salt-based UV absorbers.

The inkjet ink can be produced by dispersing or dissolving a composition containing at least water, a water-soluble organic solvent, a pigment, and the above-described copolymer or a salt thereof using a dispersion apparatus, and then stirring the resulting mixture with a stirrer.

Preferably, a composition containing water, a pigment, and the copolymer or a salt thereof is dispersed with a dispersion apparatus to prepare a pigment dispersion in advance.

The content of the pigment in the pigment dispersion is usually 0.1% to 50% by mass, and preferably 0.1% to 30% by mass.

Specific examples of the dispersion apparatus include, but are not particularly limited to, a sand mill, a homogenizer, a ball mill, a paint shaker, and an ultrasonic dispersion apparatus.

Specific examples of the stirrer include, but are not particularly limited to, a stirrer having a stirring blade, a magnetic stirrer, and a high-speed dispersion apparatus.

During the preparation of the pigment dispersion and the inkjet ink, coarse particles are preferably filtered with a filter, a centrifuge, or the like.

The viscosity of the inkjet ink at 25° C. is preferably 3 to 20 mPa·s. When the viscosity of the inkjet ink at 25° C. is 3 mPa·s or more, the image density can be improved and bleeding of an image can be suppressed. When the viscosity of the inkjet ink at 25° C. is 20 mPa·s or less, ejection stability of the inkjet ink can be improved.

The viscosity of the inkjet ink at 25° C. can be measured with a viscometer RL-550 (manufactured by Toki Sangyo Co., Ltd.).

The pH of the inkjet ink is usually 8.5 to 11, and preferably 9 to 11. When the pH of the inkjet ink is 8.5 or more, storage stability of the inkjet ink can be improved. When the pH of the inkjet ink is 11 or less, corrosion of an inkjet head and an ink supply unit can be suppressed.

The pH of the inkjet ink can be measured with a pH meter HM-30R (manufactured by DKK-TOA Corporation).

The surface tension of the inkjet ink at 25° C. is preferably 40 mN/m or less. In this case, a leveling property of the inkjet ink can be improved.

Next, an ink storage container, an inkjet recording apparatus, a method for producing recorded matter, and recorded matter according to embodiments of the present invention will be described.

Ink Storage Container

An ink storage container according to an embodiment of the present invention includes an ink storage portion that stores an inkjet ink according to an embodiment of the present invention and may optionally include another member that is appropriately selected.

The shape, structure, size, and material of the container are not particularly limited and can be appropriately selected in accordance with the purpose. For example, the container preferably includes at least an ink storage portion formed by using an aluminum laminate film, a resin film, or the like.

Figure 2:
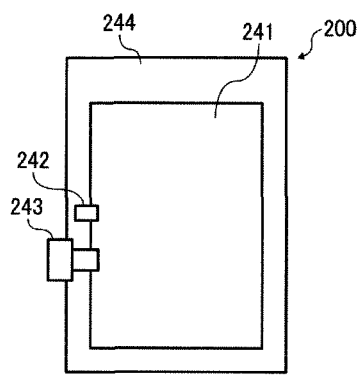
FIG. 2 is a schematic plan view of the ink storage container shown in FIG. 1 and a case (housing) of the ink storage container.

An ink storage container according to an embodiment of the present invention will be described with reference to FIGS. 1 and 2. FIG. 1 is a schematic plan view illustrating an ink storage container according to an embodiment of the present invention. FIG. 2 is a schematic plan view of the ink storage container shown in FIG. 1 and a case (housing) of the ink storage container.

As shown in FIG. 1, in an ink storage container 200, an ink is charged from an ink inlet 242 into an ink storage portion 241, gas is evacuated from the ink storage portion 241, and the ink inlet 242 is then sealed by fusion. At the time of use, a needle in an apparatus body is inserted into an ink outlet 243 formed of a rubber member to supply the ink to the apparatus.

The ink storage portion 241 is formed of a packaging member such as a gas-impermeable aluminum laminate film. As shown in FIG. 2, the ink storage portion 241 is usually housed in a storage container case 244 composed of a plastic, and is used in a state of being detachably attached to an inkjet recording apparatus.

Inkjet Recording Apparatus

An inkjet recording apparatus according to an embodiment of the present invention is an inkjet recording apparatus that records information or an image on a recording medium by ejecting an ink by using an inkjet head, in which the ink is the inkjet ink according to an embodiment of the present invention.

The inkjet recording apparatus includes a device that ejects the inkjet ink according to an embodiment of the present invention and further includes a control device, etc., as required.

Specific examples of the device that ejects an inkjet ink include, but are not particularly limited to, an inkjet head that applies a stimulus (energy) to an inkjet ink.

Specific examples of the stimulus (energy) include, but are not particularly limited to, heat (temperature), pressure, vibrations, and light. These stimuli may be used in combination of two of more thereof. Among these, heat and pressure are preferable.

For example, in the case where the stimulus is heat, thermal energy corresponding to a recording signal is applied to an inkjet ink in an inkjet head using a heat element, thereby generating an air bubble in the inkjet ink. The inkjet ink is ejected from a nozzle by using pressure of the air bubble.

In the case where the stimulus is pressure, a voltage is applied to a piezoelectric element bonded to a pressure chamber provided in an ink flow path in an inkjet head, thereby bending the piezoelectric element, reducing the volume of the pressure chamber, and ejecting an inkjet ink from a nozzle.

Specific examples of the control device include, but are not limited to, a sequencer and a computer.

Specific examples of the inkjet recording apparatus include, but are not limited to, an inkjet printer, a facsimile apparatus, a copying machine, and a printer/facsimile/copier complex machine.

Specific examples of the recording medium on which an image is recorded by using an inkjet recording apparatus include, but are not particularly limited to, plain paper, coated paper for printing, glossy paper, specialty paper, cloths, films, and overhead projector (OHP) sheets.

An inkjet recording apparatus according to an embodiment of the present invention will now be described with reference to the drawings.

Figure 3:
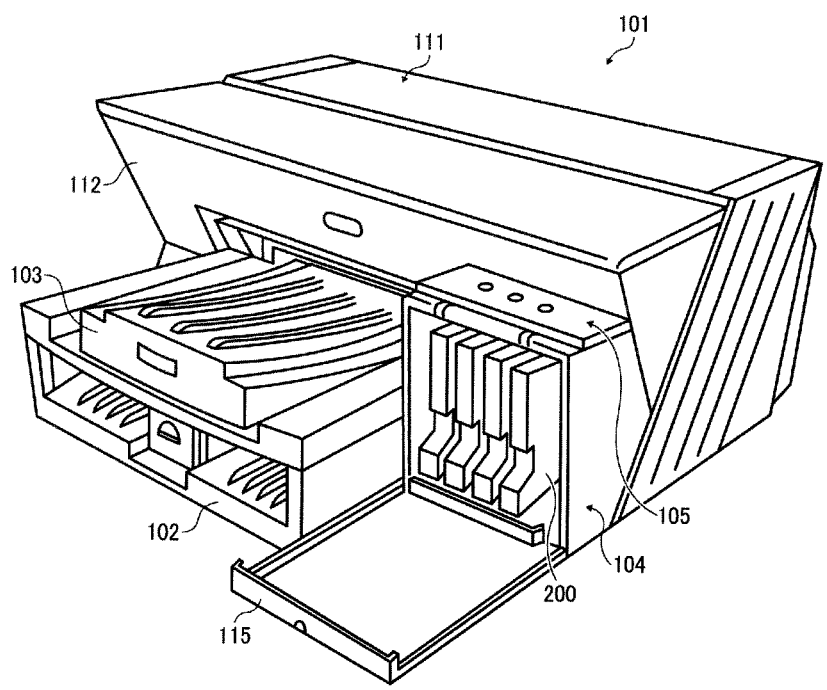
FIG. 3 is a perspective view showing an inkjet recording apparatus according to an embodiment of the present invention.

FIG. 3 is a perspective view showing an inkjet recording apparatus according to an embodiment of the present invention.

The inkjet recording apparatus shown in FIG. 3 includes an apparatus body 101; a paper feed tray 102 for charging sheets therein, the paper feed tray 102 being attached to the apparatus body 101; a paper output tray 103 for stocking sheets on which an image is recorded (formed), the paper output tray 103 being attached to the apparatus body 101; and an ink storage container attachment portion 104 disposed at an end side of a front surface 112 of the apparatus body 101, the ink storage container attachment portion 104 projecting outward from the front surface 112 and being disposed so as to be lower than an upper cover Ill. An operating portion 105 including an operation key, an indicator, and the like is provided on the upper surface of the ink storage container attachment portion 104. The ink storage container attachment portion 104 includes an openable and closable front cover 115 for attaching and detaching the ink storage container 200.

Figure 4:
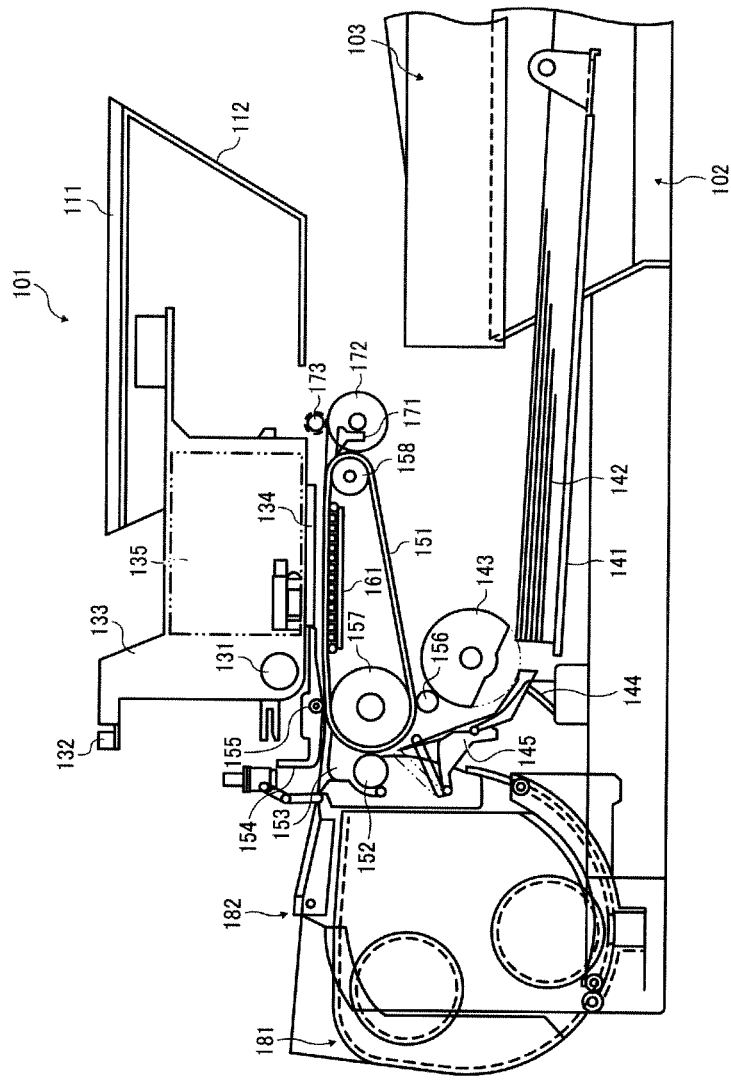
FIG. 4 is a schematic view showing the overall structure of the inkjet recording apparatus shown in FIG. 3.
Figure 5:
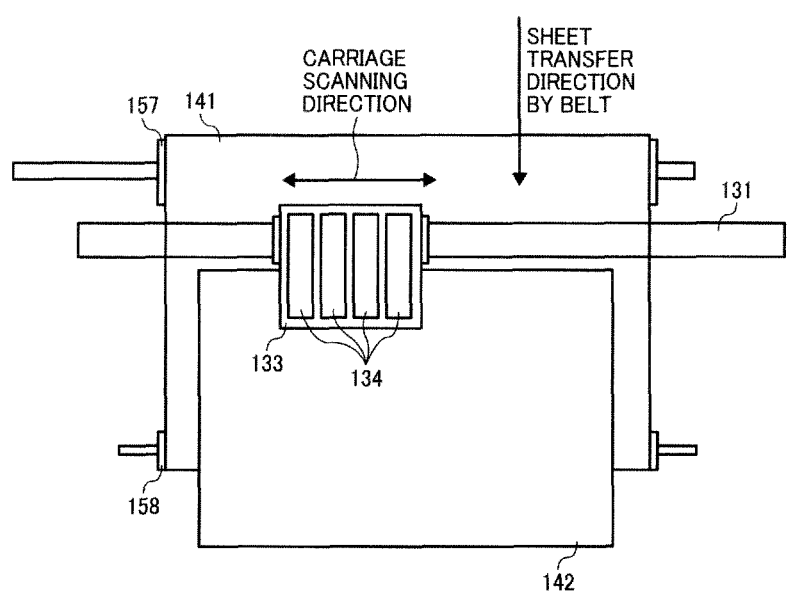
FIG. 5 is a partially enlarged view of the inkjet recording apparatus shown in FIG. 3.

In the apparatus main body 101, as shown in FIG. 4 and FIG. 5 (partially enlarged view of the inkjet recording apparatus shown in FIG. 3), a carriage 133 is slidably held in a main scanning direction by a guide rod 131, which is a guide member laterally disposed between left and right side plates (not shown), and a stay 132. The carriage 133 is moved for scanning by a main scanning motor in the directions shown by the arrows in FIG. 5.

A recording head 134 including four inkjet recording heads that eject ink droplets of yellow (Y), cyan (C), magenta (M), and black (Bk) is installed in the carriage 133 such that a plurality of ink ejection ports are aligned in a direction intersecting the main scanning direction and the ink droplet ejection direction is directed downward.

Examples of the inkjet recording heads constituting the recording head 134 include heads including an energy-generating device for ejecting an ink, such as a piezoelectric actuator, e.g., a piezoelectric element, a thermal actuator that utilizes a phase change caused by film boiling of a liquid by using a thermoelectric transducer such as a heat element, a shape-memory alloy actuator that utilizes a metal phase change caused by a temperature change, and an electrostatic actuator that utilizes the electrostatic force. A sub-tank 135 of each color for supplying the inks of each color to the recording head 134 is installed in the carriage 133. To the sub-tank 135, the ink is supplied and replenished from the ink storage container 200 according to an embodiment of the present invention arranged in the ink storage container attachment portion 104 through an ink supply tube (not shown).

As a paper feed unit for feeding sheets 142 stacked on a paper stacking section (pressure plate) 141 of a paper feed tray 102, a half-moon roller (paper feed roller 143) and a separation pad 144 are provided. The half-moon roller (paper feed roller 143) feeds the sheets 142 one by one from the paper stacking section 141. The separation pad 144 is arranged so as to face the paper feed roller 143 and composed of a material having a large friction coefficient. The separation pad 144 is pressed toward the paper feed roller 143 side.

As a transport unit for transporting a sheet 142, which has been fed from the paper feed unit, below the recording head 134, a transport belt 151, a counter roller 152, a transport guide 153, and an end-pressing roller 155 are provided. The transport belt 151 transports the sheet 142 by means of electrostatic attraction. The counter roller 152 transports the sheet 142, which is sent from the paper feed unit through a guide 145, while sandwiching the sheet 142 between the counter roller 152 and the transport belt 151. The transport guide 153 changes the direction of the sheet 142, which is sent upward in the substantially vertical direction, by about 90° to conform to the transport belt 151. The end-pressing roller 155 is pressed by a pressing member 154 toward the transfer belt 151 side.

A charging roller 156 which is a charging device for charging a surface of the transport belt 151 is provided. The transport belt 151, which is an endless belt, extends between a transport roller 157 and a tension roller 158, and can be moved in circles in a belt transport direction. The transport belt 151 has a surface layer serving as a sheet-adsorbing surface and a back layer (intermediate resistance layer or ground layer). The surface layer is composed of a resin material such as an ethylene-tetrafluoroethylene copolymer (ETFE) which has a thickness of about 40 µm and which is not subjected to resistance control. The back layer is composed of the same material as the surface layer and is subjected to resistance control with carbon. On the back side of the transport belt 151, a guide member 161 is arranged so as to correspond to a region where printing is performed by the recording head 134.

As a paper output unit for outputting the sheet 142 on which recording has been performed by the recording head 134, a separation claw 171 for separating the sheet 142 from the transport belt 151, a paper output roller 172, and a paper output small roller 173 are provided. A paper output tray 103 is arranged below the paper output roller 172.

A double-side paper feed unit 181 is detachably attached to a rear surface portion of the apparatus body 101.

The double-side paper feed unit 181 takes the sheet 142 returned by a rotation of the transport belt 151 in the opposite direction and reverses the sheet 142, then feeds the sheet 142 again between the counter roller 152 and the transport belt 151. A manual paper feed unit 182 is provided on an upper surface of the double-side paper feed unit 181.

In this inkjet recording apparatus, sheets 142 are separately fed one by one from the paper feed unit, and a sheet 142 fed upward in the substantially vertical direction is guided by the guide 145 and transported between the transport belt 151 and the counter roller 152. Furthermore, an end of the sheet 142 is guided by the transport guide 153 and is pressed onto the transport belt 151 by the end-pressing roller 155. Thus, the transport direction of the sheet 142 is changed by about 90°. At this time, the transport belt 151 is charged by the charging roller 156, and the sheet 142 is transported in a state of being electrostatically attracted onto the transport belt 151. Here, by driving the recording head 134 in accordance with an image signal while moving the carriage 133, ink droplets are ejected onto the sheet 142, which is stopped, to conduct recording for one line. After the sheet 142 is transported by a particular distance, recording for the next line is conducted.

Upon receiving a recording completion signal or such a signal that the rear end of the sheet 142 has reached the recording region, the recording operation is finished, and the sheet 142 is output onto the paper output tray 103. When it is sensed that there is hardly any ink remaining in the sub-tank 135, that is, the amount of ink remaining in the sub-tank 135 reaches a near-end level, a required amount of ink is supplied from the ink storage container 200 to the sub-tank 135.

As for this inkjet recording apparatus, when an ink in the ink storage container 200 according to an embodiment of the present invention is used up, only the ink storage portion inside the ink storage container 200 can be replaced by disassembling the housing of the ink storage container 200. Even when the ink storage container 200 is longitudinally placed and has a front-surface attachment structure, the ink can be stably supplied. Therefore, even when the apparatus body 101 is placed in a state where an upper space of the apparatus body 101 is occupied, for example, when the apparatus body 101 is placed in a rack or when an object is placed on the apparatus body 101, the ink storage container 200 can be easily replaced.

A description has been made of an embodiment in which the present invention is applied to a serial-type (shuttle-type) inkjet recording apparatus including a carriage that scans. The present invention can be similarly applied to a line-type inkjet recording apparatus including a line-type head.

Recorded Matter and Method of Producing Recorded Matter

A method for producing recorded matter according to an embodiment of the present invention includes a step of conducting recording on a recording medium by ejecting an ink from an inkjet head, in which the ink is an inkjet ink according to an embodiment of the present invention.

Recorded matter according to an embodiment of the present invention is produced by recording information or an image on a recording medium by using an ink, in which the ink is an inkjet ink according to an embodiment of the present invention.

Specifically, in the recorded matter according to an embodiment of the present invention, information or an image is recorded on a recording medium by using an inkjet ink according to an embodiment of the present invention. The recorded matter according to an embodiment of the present invention can be produced by a step of conducting recording on a recording medium by ejecting an inkjet ink from an inkjet head.

The recording medium is not particularly limited and can be appropriately selected in accordance with the purpose. Specific examples of the recording medium include, but are not limited to, plain paper, coated paper for printing, glossy paper, specialty paper, cloths, films, and OHP sheets. These recording media may be used alone or in combination of two or more thereof.

Among these, at least one of plain paper and coated paper for printing is preferable. Plain paper is advantageous in that it is inexpensive. Coated paper for printing is advantageous in that it is relatively inexpensive as compared with glossy paper and provides flat and smooth images having glossiness. Plain paper and coated paper for printing have poor drying properties, and thus, in the related art, it has been generally difficult to use such paper for inkjet printing. However, the drying properties have been improved by using the ink according to an embodiment of the present invention, and it has become possible to use plain paper and coated paper for printing.

The recorded matter according to an embodiment of the present invention has a high image quality without bleeding, and good stability with time. Thus, the recorded matter can be suitably used in various applications, such as documents on which texts or images are recorded.

Having generally described preferred embodiments of this invention, further understanding can be obtained by reference to certain specific examples, which are provided herein for the purpose of illustration only and are not intended to be limiting. In the descriptions in the following examples, the numbers in parts represent weight ratios in parts unless otherwise specified.

EXAMPLES

The present invention will be further described using Examples. However, the present invention is not limited to the Examples. In the Examples described below, the term "parts" means "parts by mass".

Examples and Comparative Examples in the Case Where Structural Unit Represented by Formula 3 Was Used As Component of Copolymer Synthesis of Oleyl Methacrylate In a 2-L eggplant-shaped flask equipped with a stirrer, an air bubbling tube, a dehydration tube, and a condenser tube, 600 g of oleyl alcohol UNJECOL-90N (manufactured by New Japan Chemical Co., Ltd.), 392 g of methacrylic acid, 400 g of n-heptane, 1.0 g of p-toluenesulfonic acid, and 4.96 g of hydroquinone monomethyl ether were charged, and a dehydration reaction was conducted at 120° C. for nine hours. Subsequently, the resulting product was washed with alkaline water, and then washed with water twice. Furthermore, low-boiling components were removed by using an evaporator while air was bubbled. Thus, 749 g of oleyl methacrylate represented by Formula 7-1 below was obtained.

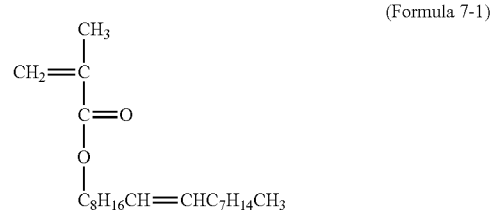

(Formula 7-1)

Synthesis of Oleyl Acrylate

Similarly, 720 g of oleyl acrylate represented by Formula 7-2 below was obtained as in the <Synthesis of oleyl methacrylate> described above except that 392 g of methacrylic acid was replaced by 328 g of acrylic acid.

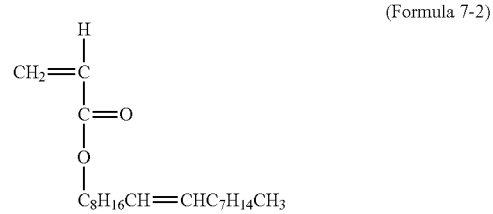

(Formula 7-2)

Synthesis of Copolymer A-1

In a flask equipped with a stirrer, a thermometer, and a nitrogen-introducing tube, 500 parts of 1-methoxy-2-propanol serving as a solvent, 30 parts of Phosmer M represented by Formula 5-1 below, 10 parts of diacetone acrylamide, 60 parts of oleyl methacrylate, and 4 parts of azobisisobutyronitrile serving as a polymerization initiator were put. The temperature was then increased to 65° C., and polymerization was conducted for 15 hours in a nitrogen stream. Next, about half of the solvent was distilled off, and the resulting reaction mixture was then poured into a large amount of methanol to precipitate Copolymer A-1. The precipitated Copolymer A-1 was further dried. Copolymer A-1 had a weight-average molecular weight of 30,000.

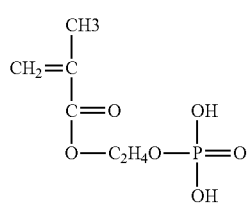

(Formula 5-1)

Synthesis of Copolymer A-2

Copolymer A-2 having a weight-average molecular weight of 31,000 was obtained as in Copolymer A-1 except that Phosmer M was replaced by Light Acrylate P-1A represented by Formula 5-2 below.

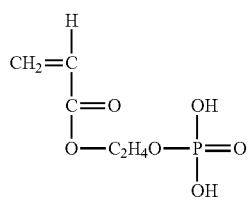

(Formula 5-2)

Synthesis of Copolymer A-3

Copolymer A-3 having a weight-average molecular weight of 32,000 was obtained as in Copolymer A-1 except that Phosmer M was replaced by Phosmer PE represented by Formula 5-3 below.

(Formula 5-3)

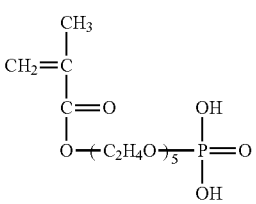

Synthesis of Copolymer A-4

Copolymer A-4 having a weight-average molecular weight of 32,000 was obtained as in Copolymer A-1 except that Phosmer M was replaced by Phosmer PP represented by Formula 5-4 below.

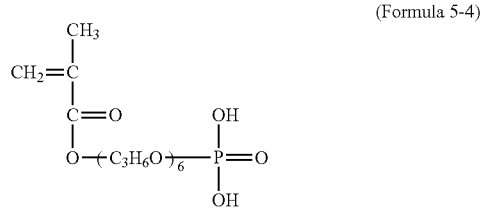

(Formula 5-4)

Synthesis of Copolymer A-5

Copolymer A-5 having a weight-average molecular weight of 31,000 was obtained as in Copolymer A-1 except that Phosmer M was replaced by a compound represented by Formula 5-5 below.

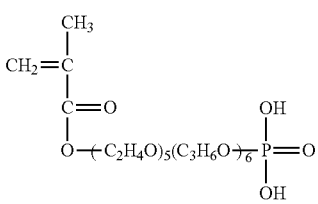

(Formula 5-5)

Synthesis of Copolymer A-6

Copolymer A-6 having a weight-average molecular weight of 29,000 was obtained as in Copolymer A-1 except that diacetone acrylamide was replaced by diacetone methacrylamide.

Synthesis of Copolymer A-7

Copolymer A-7 having a weight-average molecular weight of 31,000 was obtained as in Copolymer A-1 except that oleyl methacrylate was replaced by oleyl acrylate.

Synthesis of Copolymer A-8

Copolymer A-8 having a weight-average molecular weight of 32,000 was obtained as in Copolymer A-1 except that the amounts of Phosmer M, diacetone acrylamide, and oleyl methacrylate added were changed to 5 parts, 5 parts, and 90 parts, respectively.

Synthesis of Copolymer A-9

Copolymer A-9 having a weight-average molecular weight of 31,000 was obtained as in Copolymer A-1 except that the amounts of Phosmer M, diacetone acrylamide, and oleyl methacrylate added were changed to 10 parts, 10 parts, and 80 parts, respectively.

Synthesis of Copolymer A-10

Copolymer A-10 having a weight-average molecular weight of 30,000 was obtained as in Copolymer A-1 except that the amounts of Phosmer M, diacetone acrylamide, and oleyl methacrylate added were changed to 60 parts, 30 parts, and 10 parts, respectively.

Synthesis of Copolymer A-11

Copolymer A-11 having a weight-average molecular weight of 29,000 was obtained as in Copolymer A-1 except that the amounts of Phosmer M, diacetone acrylamide, and oleyl methacrylate added were changed to 80 parts, 15 parts, and 5 parts, respectively.

Synthesis of Copolymer A-12

Copolymer A-12 having a weight-average molecular weight of 3,000 was obtained as in Copolymer A-1 except that the temperature was increased to 75° C. and the polymerization time was changed to 3 hours.

Synthesis of Copolymer A-13

Copolymer A-13 having a weight-average molecular weight of 5,100 was obtained as in Copolymer A-1 except that the polymerization time was changed to 4 hours.

Synthesis of Copolymer A-14

Copolymer A-14 having a weight-average molecular weight of 49,000 was obtained as in Copolymer A-1 except that the temperature was increased to 50° C. and the polymerization time was changed to 25 hours.

Synthesis of Copolymer A-15

Copolymer A-15 having a weight-average molecular weight of 70,000 was obtained as in Copolymer A-1 except that the temperature was increased to 50° C. and the polymerization time was changed to 48 hours.

Synthesis of Copolymer A-16

Copolymer A-16 having a weight-average molecular weight of 3,100 was obtained as in Copolymer A-1 except that the amounts of Phosmer M, diacetone acrylamide, and oleyl methacrylate added were changed to 5 parts, 5 parts, and 90 parts, respectively, the temperature was increased to 75° C., and the polymerization time was changed to 3 hours.

Synthesis of Copolymer A-17

Copolymer A-17 having a weight-average molecular weight of 72,000 was obtained as in Copolymer A-1 except that the amounts of Phosmer M, diacetone acrylamide, and oleyl methacrylate added were changed to 5 parts, 5 parts, and 90 parts, respectively, the temperature was increased to 50° C., and the polymerization time was changed to 48 hours.

Synthesis of Copolymer A-18

Copolymer A-18 having a weight-average molecular weight of 3,000 was obtained as in Copolymer A-1 except that the amounts of Phosmer M, diacetone acrylamide, and oleyl methacrylate added were changed to 80 parts, 15 parts, and 5 parts, respectively, the temperature was increased to 75° C., and the polymerization time was changed to 3 hours.

Synthesis of Copolymer A-19

Copolymer A-19 having a weight-average molecular weight of 70,000 was obtained as in Copolymer A-1 except that the amounts of Phosmer M, diacetone acrylamide, and oleyl methacrylate added were changed to 80 parts, 15 parts, and 5 parts, respectively, the temperature was increased to 50° C., and the polymerization time was changed to 48 hours.

Synthesis of Copolymer A-20

In a flask equipped with a stirrer, a thermometer, and a nitrogen-introducing tube, 500 parts of 1-methoxy-2-propanol serving as a solvent, 30 parts of Phosmer M represented by Formula 5-1 below, 70 parts of styrene, and 4 parts of azobisisobutyronitrile serving as a polymerization initiator were put. The temperature was then increased to 65° C., and polymerization was conducted for 5 hours in a nitrogen stream. Next, about half of the solvent was distilled off, and the resulting reaction mixture was then poured into a large amount of methanol to precipitate Copolymer A-20. The precipitated Copolymer A-20 was further dried. Copolymer A-20 had a weight-average molecular weight of 7,000.

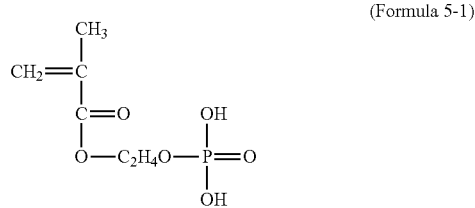

(Formula 5-1)

Characteristics of Copolymers A-1 to A-20 are shown in Table 1.

Weight-average Molecular Weight

The weight-average molecular weight was measured by gel permeation chromatography (GPC) using a column oven CTO-20A (manufactured by Shimadzu Corporation), a detector RID-10A (manufactured by Shimadzu Corporation), an eluent flow path pump LC-20AD (manufactured by Shimadzu Corporation), a degasser DGU-20A (manufactured by Shimadzu Corporation), and an autosampler SIL-20A (manufactured by Shimadzu Corporation). A TSKgel G3000PWXL size exclusion chromatography (SEC) column for aqueous solvents, the column having an exclusion limit molecular weight of $2\times10^5$, a TSKgel G5000PWXL column having an exclusion limit molecular weight of $2.5\times10^6$, and a TSKgel G6000PWXL column having an exclusion limit molecular weight of $5\times10^7$, (all of which are manufactured by Tosoh Corporation) were connected to each other and used as columns. A sample prepared by diluting with an eluent so as to have a concentration of 2 g/100 mL was used. An aqueous solution containing 0.5 mol/L of acetic acid and 0.5 mol/L of sodium acetate was used as the eluent. The column temperature was 40° C., and the flow rate was 1.0 mL/min. A calibration curve was prepared by using nine types of polyethylene glycol standard samples having molecular weights of 1,065, 5,050, 24,000, 50,000, 107,000, 140,000, 250,000, 540,000, and 920,000.

TABLE 1

| Copolymer | Compounds constituting copolymer A- | | | Component ratio of copolymer A- | | | Molecular weight |
| | Structure 1 | Structure 2 | Structure 3 | Structure 1 Content | Structure 2 Content | Structure 3 Content | |
|---|---|---|---|---|---|---|---|
| Copolymer A-1 | Formula 5-1 (Phosmer M) | Diacetone acrylamide | Oleyl methacrylate | 30 | 10 | 60 | 30,000 |
| Copolymer A-2 | Formula 5-2 (P-1A) | Diacetone acrylamide | Oleyl methacrylate | 30 | 10 | 60 | 31,000 |
| Copolymer A-3 | Formula 5-3 (Phosmer PE) | Diacetone acylamide | Oleyl methacrylate | 30 | 10 | 60 | 32,000 |
| Copolymer A-4 | Formula 5-4 (Phosmer PP) | Diacetone acrylamide | Oleyl methacrylate | 30 | 10 | 60 | 32,000 |
| Copolymer A-5 | Formula 5-5 | Diacetone acrylamide | Oleyl methacrylate | 30 | 10 | 60 | 31,000 |
| Copolymer A-6 | Formula 5-1 (Phosmer M) | Diacetone methacrylamide | Oleyl methacrylate | 30 | 10 | 60 | 29,000 |
| Copolymer A-7 | Formula 5-1 (Phosmer M) | Diacetone acrylamide | Oleyl acrylate | 30 | 10 | 60 | 31,000 |
| Copolymer A-8 | Formula 5-1 (Phosmer M) | Diacetone acrylamide | Oleyl methacrylate | 5 | 5 | 90 | 32,000 |
| Copolymer A-9 | Formula 5-1 (Phosmer M) | Diacetone acrylamide | Oleyl methacrylate | 10 | 10 | 80 | 31,000 |
| Copolymer A-10 | Formula 5-1 (Phosmer M) | Diacetone acrylamide | Oleyl methacrylate | 60 | 30 | 10 | 30,000 |
| Copolymer A-11 | Formula 5-1 (Phosmer M) | Diacetone acrylamide | Oleyl methacrylate | 80 | 15 | 5 | 29,000 |
| Copolymer A-12 | Formula 5-1 (Phosmer M) | Diacetone acrylamide | ( )ley! methacrylate | 30 | 10 | 60 | 3,000 |
| Copolymer A-13 | Formula 5-1 (Phosmer M) | Diacetone acrylamide | Oleyl methacrylate | 30 | 10 | 60 | 5,100 |
| Copolymer A-14 | Formula 5-1 (Phosmer M) | Diacetone acrylamide | Oleyl methacrylate | 30 | 10 | 60 | 49,000 |
| Copolymer A-15 | Formula 5-1 (Phosmer M) | Diacetone acrylamide | Oleyl methacrylate | 30 | 10 | 60 | 70,000 |
| Copolymer A-16 | Formula 5-1 (Phosmer M) | Diacetone acrylamide | Oleyl methacrylate | 5 | 5 | 90 | 3,100 |
| Copolymer A-17 | Formula 5-1 (Phosmer M) | Diacetone acrylamide | Oleyl methacrylate | 5 | 5 | 90 | 72,000 |
| Copolymer A-18 | Formula 5-1 (Phosmer M) | Diacetone acrylamide | Oleyl methacrylate | 80 | 15 | 5 | 3,000 |
| Copolymer A-19 | Formula 5-1 (Phosmer M) | Diacetone acrylamide | Oleyl methacrylate | 80 | 15 | 5 | 70,000 |
| Copolymer A-20 | Formula 5-1 (Phosmer M) | — | Styrene | 30 | — | 70 | 7,000 |

Example A-1

First, 10 g of Copolymer A-1 and 80 g of water were mixed, and the mixture was then neutralized by adding a 10% by weight aqueous potassium hydroxide solution dropwise to the mixture so that the neutralization ratio became 100%. Next, the resulting mixture was diluted with water to prepare a 10% by weight aqueous solution of a potassium salt of Copolymer A-1.

Subsequently, 20 parts of carbon black N1PEX 150 (manufactured by Degussa), 50 parts of the 10% by weight aqueous solution of the potassium salt of Copolymer A-1, and 30 parts of pure water were mixed. The resulting mixture was then dispersed at a peripheral speed of 10 m/s for 10 minutes while being circulated using a disc-type bead mill KDL (manufactured by Shinmaru Enterprises Corporation). In this step, zirconia balls having a diameter of 0.1 mm were used as media. Next, the resulting dispersion was filtered with a membrane filter having a pore size of 1.2 μm, and then diluted with water. Thus, a pigment dispersion having a concentration of 20% by mass was prepared.

Next, 40 parts of the 20% by weight pigment dispersion, 20 parts of 1,3-butanediol serving as a humectant, 10 parts of glycerin serving as a humectant, 1 part of 2-ethyl-1,3-hexanediol serving as a penetrant, 1 part of 2,2,4-trimethyl-1,3-pentanediol serving as a penetrant, 2 parts of 40% by weight fluorine-based surfactant Zonyl FS-300 (manufactured by Dupont), and 26 parts of distilled water were mixed, and the resulting mixture was then stirred for 1.5 hours. Next, the mixture was filtered with a membrane filter having a pore size of 1.2 μm. Thus, an inkjet ink was obtained.

The inkjet ink was charged into an inkjet printer IPSiO GX5000 (manufactured by Ricoh Company, Ltd.). Printing was performed on plain paper 1 (XEROX 4200, manufactured by Xerox Corporation, having a calcium carbonate content of about 16% by mass) and plain paper 2 (My Paper, manufactured by Ricoh Company, Ltd., having a calcium carbonate content of about 4% by mass) as described below. Thus, printed matter on which the above-prepared inkjet ink was printed was obtained.

Example A-2

An inkjet ink and printed matter were obtained as in Example A-1 except that carbon black NIPEX 150 (manufactured by Degussa) was replaced by Pigment Blue 15:3 (manufactured by Dainichiseika Color & Chemicals Mfg. Co., Ltd., Chromofine Blue, cyan pigment).

Example A-3

An inkjet ink and printed matter were obtained as in Example A-1 except that carbon black NIPEX 150 (manufactured by Degussa) was replaced by Pigment Red 122 (manufactured by Clariant, Toner magenta EO02, magenta pigment).

Example A-4

An inkjet ink and printed matter were obtained as in Example A-1 except that carbon black NIPEX 150 (manufactured by Degussa) was replaced by Pigment Yellow (manufactured by Dainichiseika Color & Chemicals Mfg. Co., Ltd., Fast Yellow 531, yellow pigment).

Example A-5

An inkjet ink and printed matter were obtained as in Example A-1 except that Copolymer A-1 was replaced by Copolymer A-2.

Example A-6

An inkjet ink and printed matter were obtained as in Example A-1 except that Copolymer A-1 was replaced by Copolymer A-3.

Example A-7

An inkjet ink and printed matter were obtained as in Example A-1 except that Copolymer A-1 was replaced by Copolymer A-4.

Example A-8

An inkjet ink and printed matter were obtained as in Example A-1 except that Copolymer A-1 was replaced by Copolymer A-5.

Example A-9

An inkjet ink and printed matter were obtained as in Example A-1 except that Copolymer A-1 was replaced by Copolymer A-6.

Example A-10

An inkjet ink and printed matter were obtained as in Example A-1 except that Copolymer A-1 was replaced by Copolymer A-7.

Example A-11

An inkjet ink and printed matter were obtained as in Example A-1 except that the 10% by weight aqueous potassium hydroxide solution was replaced by a 10% by weight aqueous lithium hydroxide solution, and an aqueous solution of a lithium salt of Copolymer A-1 was used.

Example A-12

An inkjet ink and printed matter were obtained as in Example A-1 except that the 10% by weight aqueous potassium hydroxide solution was replaced by a 10% by weight aqueous solution of dimethylaminoethanolamine, and an aqueous solution of a dimethylaminoethanolamine salt of Copolymer A-1 was used.

Example A-13

An inkjet ink and printed matter were obtained as in Example A-1 except that the 10% by weight aqueous potassium hydroxide solution was used and the neutralization ratio was controlled to 50%.

Example A-14

An inkjet ink and printed matter were obtained as in Example A-1 except that Copolymer A-1 was replaced by Copolymer A-8.

Example A-15

An inkjet ink and printed matter were obtained as in Example A-1 except that Copolymer A-1 was replaced by Copolymer A-9.

Example A-16

An inkjet ink and printed matter were obtained as in Example A-1 except that Copolymer A-1 was replaced by Copolymer A-10.

Example A-17

An inkjet ink and printed matter were obtained as in Example A-1 except that Copolymer A-1 was replaced by Copolymer A-11.

Example A-18

An inkjet ink and printed matter were obtained as in Example A-1 except that Copolymer A-1 was replaced by Copolymer A-12.

Example A-19

An inkjet ink and printed matter were obtained as in Example A-1 except that Copolymer A-1 was replaced by Copolymer A-13.

Example A-20

An inkjet ink and printed matter were obtained as in Example A-1 except that Copolymer A-1 was replaced by Copolymer A-14.

Example A-21

An inkjet ink and printed matter were obtained as in Example A-1 except that Copolymer A-1 was replaced by Copolymer A-15.

Example A-22

An inkjet ink and printed matter were obtained as in Example A-1 except that Copolymer A-1 was replaced by Copolymer A-16.

Example A-23

An inkjet ink and printed matter were obtained as in Example A-1 except that Copolymer A-1 was replaced by Copolymer A-17.

Example A-24

An inkjet ink and printed matter were obtained as in Example A-1 except that Copolymer A-1 was replaced by Copolymer A-18.

Example A-25

An inkjet ink and printed matter were obtained as in Example A-1 except that Copolymer A-1 was replaced by Copolymer A-19.

Comparative Example A-1

An inkjet ink and printed matter were obtained as in Example A-1 except that Copolymer A-1 was replaced by Copolymer A-20.

The image density and storage stability of each of the inkjet inks of Examples A-1 to A-25 and Comparative Example A-1 were evaluated.

Image Density on Plain Paper

In an environment at 23° C. and 50% RH, an inkjet ink was charged into an inkjet printer IPSiO GX5000 (manufactured by Ricoh Company, Ltd.). Next, a chart of the general character (size: 64 points) of JIS X 0208 (1997), 2223 formed by using Microsoft Word 2000 (manufactured by Microsoft Corporation) was printed on plain paper 1 (XEROX 4200. manufactured by Xerox Corporation, having a calcium carbonate content of about 16% by mass) and plain paper 2 (My Paper, manufactured by Ricoh Company, Ltd., having a calcium carbonate content of about 4% by mass). Subsequently, the image density of the general symbols was measured with X-Rite 938 (manufactured by Romix Corporation). In this test, by the user settings for plain paper, the "plain paper-standard quick" mode was changed to "without color correction" by using a driver attached to the inkjet printer, and this new mode was used as a printing mode.

In the case of a black ink, the evaluation was performed by the following criteria. When the image density was 1.25 or more, the sample was evaluated as "A". When the image density was 1.20 or more and less than 1.25, the sample was evaluated as "B". When the image density was 1.10 or more and less than 1.20, the sample was evaluated as "C". When the image density was less than 1.10, the sample was evaluated as "D". When the image density was less than 1.00 or the evaluation could not be performed due to gelation of the black ink, the sample was evaluated as "E".

In the case of a yellow ink, the evaluation was performed by the following criteria. When the image density was 0.75 or more, the sample was evaluated as "B". When the image density was 0.70 or more and less than 0.75, the sample was evaluated as "C". When the image density was 0.65 or more and less than 0.70, the sample was evaluated as "D". When the image density was less than 0.65 or the evaluation could not be performed due to gelation of the yellow ink, the sample was evaluated as "E".

In the case of a magenta ink, the evaluation was performed by the following criteria. When the image density was 0.90 or more, the sample was evaluated as "B". When the image density was 0.80 or more and less than 0.90, the sample was evaluated as "C". When the image density was 0.70 or more and less than 0.80, the sample was evaluated as "D". When the image density was less than 0.70 or the evaluation could not be performed due to gelation of the magenta ink, the sample was evaluated as "E".

In the case of a cyan ink, the evaluation was performed by the following criteria. When the image density was 1.00 or more, the sample was evaluated as "B". When the image density was 0.90 or more and less than 1.00, the sample was evaluated as "C". When the image density was 0.80 or more and less than 0.90, the sample was evaluated as "D". When the image density was less than 0.80 or the evaluation could not be performed due to gelation of the cyan ink, the sample was evaluated as "E".

Storage Sstability

An inkjet ink was charged into an ink cartridge and stored at 60° C. for two weeks. A ratio of change in viscosity was determined by calculating a ratio of a viscosity after storage to a viscosity before storage. When the absolute value of the ratio of change in viscosity was less than 5%, the sample was evaluated as "A". When the absolute value of the ratio of change in viscosity was 5% or more and less than 8%, the sample was evaluated as "B". When the absolute value of the ratio of change in viscosity was 8% or more and less than 10%, the sample was evaluated as "C". When the absolute value of the ratio of change in viscosity was 10% or more and less than 30%, the sample was evaluated as "D". When the absolute value of the ratio of change in viscosity was 30% or more or the evaluation could not be performed due to gelation of the inkjet ink, the sample was evaluated as "E".

Table 2 shows the evaluation results of the image density and storage stability of the inkjet inks of Examples A-1 to A-25 and Comparative Example A-1.

TABLE 2

| | | | | | Effects | | |
| --- | --- | --- | --- | --- | --- | --- | --- |
| | | | | Neutralization | Image density | | |
| | Pigment used | Copolymer | Counter ion | ratio (%) of M in Formula 1 | Plain paper 1 | Plain paper 2 | Storage stability |
| Example A-1 | Carbon black | Copolymer A-1 | K | 100 | A | B | A |
| Example A-2 | Cyan pigment | Copolymer A-1 | K | 100 | B | C | A |
| Example A-3 | Magenta pigment | Copolymer A-1 | K | 100 | B | C | A |
| Example A-4 | Yellow pigment | Copolymer A-1 | K | 100 | B | C | A |
| Example A-5 | Carbon black | Copolymer A-2 | K | 100 | A | B | B |
| Example A-6 | Carbon black | Copolymer A-3 | K | 100 | A | B | B |
| Example A-7 | Carbon black | Copolymer A-4 | K | 100 | A | B | B |
| Example A-8 | Carbon black | Copolymer A-5 | K | 100 | B | B | B |
| Example A-9 | Carbon black | Copolymer A-6 | K | 100 | A | B | A |

TABLE 2-continued

| | Pigment used | Copolymer | Counter ion | Neutralization ratio (%) of M in Formula 1 | Effects | | |
|---|---|---|---|---|---|---|---|
| | | | | | Image density | | Storage stability |
| | | | | | Plain paper 1 | Plain paper 2 | |
| Example A-10 | Carbon black | Copolymer A-7 | K | 100 | A | B | A |
| Example A-11 | Carbon black | Copolymer A-1 | Li | 100 | A | B | A |
| Example A-12 | Carbon black | Copolymer A-1 | DMEA | 100 | A | B | A |
| Example A-13 | Carbon black | Copolymer A-1 | K/H | 50 | A | B | A |
| Example A-14 | Carbon black | Copolymer A-8 | K | 100 | B | B | A |
| Example A-15 | Carbon black | Copolymer A-9 | K | 100 | A | B | A |
| Example A-16 | Carbon black | Copolymer A-10 | K | 100 | A | B | A |
| Example A-17 | Carbon black | Copolymer A-11 | K | 100 | A | B | B |
| Example A-18 | Carbon black | Copolymer A-12 | K | 100 | B | B | B |
| Example A-19 | Carbon black | Copolymer A-13 | K | 100 | A | B | A |
| Example A-20 | Carbon black | Copolymer A-14 | K | 100 | A | B | A |
| Example A-21 | Carbon black | Copolymer A-15 | K | 100 | A | B | B |
| Example A-22 | Carbon black | Copolymer A-16 | K | 100 | B | C | C |
| Example A-23 | Carbon black | Copolymer A-17 | K | 100 | B | C | C |
| Example A-24 | Carbon black | Copolymer A-18 | K | 100 | B | B | C |
| Example A-25 | Carbon black | Copolymer A-19 | K | 100 | B | B | C |
| Comparative Example A-1 | Carbon black | Copolymer A-20 | K | 100 | C | D | D |

Table 2 shows that the inkjet inks of Examples A-1 to A-25 have good image densities on plain paper and good storage stability.

In contrast, the inkjet ink of Comparative Example A-1 has low storage stability because the inkjet ink contains a potassium salt of Copolymer A-20, which has a structural unit derived from styrene.

Examples and Comparative Examples in the Case Where Structural Unit Represented by Formula 4 Was Used As Component of Copolymer Synthesis of Copolymer B-1

In a flask equipped with a stirrer, a thermometer, and a nitrogen-introducing tube, 500 parts of 1-methoxy-2-propanol serving as a solvent, 30 parts of Phosmer M represented by Formula 5-1 below, 10 parts of diacetone acrylamide, 60 parts of vinylnaphthalene, and 4 parts of azobisisobutyronitrile serving as a polymerization initiator were put. The temperature was then increased to 65° C., and polymerization was conducted for 15 hours in a nitrogen stream. Next, about half of the solvent was distilled off, and the resulting reaction mixture was then poured into a large amount of methanol to precipitate Copolymer B-1. The precipitated Copolymer B-1 was further dried. Copolymer B-1 had a weight-average molecular weight of 30,000.

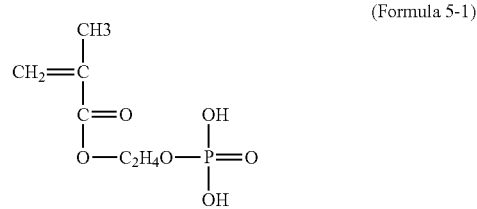

(Formula 5-1)

Synthesis of Copolymer B-2

Copolymer B-2 having a weight-average molecular weight of 31,000 was obtained as in Copolymer B-1 except that Phosmer M was replaced by Light Acrylate P-1A represented by Formula 5-2 below.

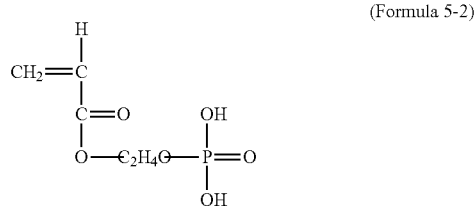

(Formula 5-2)

Synthesis of Copolymer B-3

Copolymer B-3 having a weight-average molecular weight of 32,000 was obtained as in Copolymer B-1 except that Phosmer M was replaced by Phosmer PE represented by Formula 5-3 below.

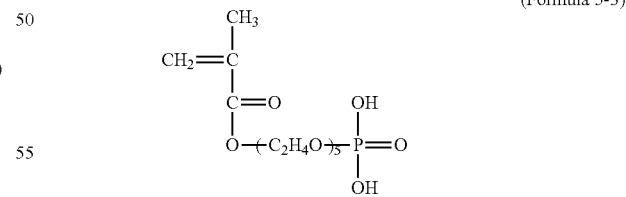

(Formula 5-3)

Synthesis of Copolymer B-4

Copolymer B-4 having a weight-average molecular weight of 32,000 was obtained as in Copolymer B-1 except that Phosmer M was replaced by Phosmer PP represented by Formula 5-4 below.

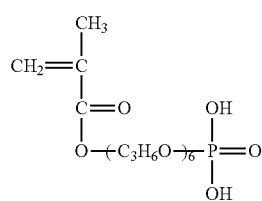

(Formula 5-4)

Synthesis of Copolymer B-5

Copolymer B-5 having a weight-average molecular weight of 31,000 was obtained as in Copolymer B-1 except that Phosmer M was replaced by a compound represented by Formula 5-5 below.

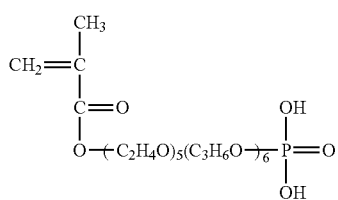

(Formula 5-5)

Synthesis of Copolymer B-6

Copolymer B-6 having a weight-average molecular weight of 29,000 was obtained as in Copolymer B-1 except that diacetone acrylamide was replaced by diacetone methaerylamide.

Synthesis of Copolymer B-7

Copolymer B-7 having a weight-average molecular weight of 32,000 was obtained as in Copolymer B-1 except that the amounts of Phosmer M, diacetone acrylamide, and vinylnaphthalene added were changed to 5 parts, 5 parts, and 90 parts, respectively.

Synthesis of Copolymer B-8

Copolymer B-8 having a weight-average molecular weight of 31,000 was obtained as in Copolymer B-1 except that the amounts of Phosmer M, diacetone acrylamide, and vinylnaphthalene added were changed to 10 parts, 10 parts, and 80 parts, respectively.

Synthesis of Copolymer B-9

Copolymer B-9 having a weight-average molecular weight of 30,000 was obtained as in Copolymer B-1 except that the amounts of Phosmer M, diacetone acrylamide, and vinylnaphthalene added were changed to 60 parts, 30 parts, and 10 parts, respectively.

Synthesis of Copolymer B-10

Copolymer B-10 having a weight-average molecular weight of 29,000 was obtained as in Copolymer B-1 except that the amounts of Phosmer M, diacetone acrylamide, and vinylnaphthalene added were changed to 80 parts, 15 parts, and 5 parts, respectively.

Synthesis of Copolymer B-11

Copolymer B-11 having a weight-average molecular weight of 3,000 was obtained as in Copolymer B-1 except that the temperature was increased to 75° C. and the polymerization time was changed to 3 hours.

Synthesis of Copolymer B-12

Copolymer B-12 having a weight-average molecular weight of 5,100 was obtained as in Copolymer B-1 except that the polymerization time was changed to 4 hours.

Synthesis of Copolymer B-13

Copolymer B-13 having a weight-average molecular weight of 49,000 was obtained as in Copolymer B-1 except that the temperature was increased to 50° C. and the polymerization time was changed to 25 hours.

Synthesis of Copolymer B-14

Copolymer B-14 having a weight-average molecular weight of 70,000 was obtained as in Copolymer B-1 except that the temperature was increased to 50° C. and the polymerization time was changed to 48 hours.

Synthesis of Copolymer B-15

Copolymer B-15 having a weight-average molecular weight of 3,100 was obtained as in Copolymer B-1 except that the amounts of Phosmer M, diacetone acrylamide, and vinylnaphthalene added were changed to 5 parts, 5 parts, and 90 parts, respectively, the temperature was increased to 75° C., and the polymerization time was changed to 3 hours.

Synthesis of Copolymer B-16

Copolymer B-16 having a weight-average molecular weight of 72,000 was obtained as in Copolymer B-1 except that the amounts of Phosmer M, diacetone acrylamide, and vinylnaphthalene added were changed to 5 parts, 5 parts, and 90 parts, respectively, the temperature was increased to 50° C., and the polymerization time was changed to 48 hours.

Synthesis of Copolymer B-17

Copolymer B-17 having a weight-average molecular weight of 3,000 was obtained as in Copolymer B-1 except that the amounts of Phosmer M, diacetone acrylamide, and vinylnaphthalene added were changed to 80 parts, 15 parts, and 5 parts, respectively, the temperature was increased to 75° C., and the polymerization time was changed to 3 hours.

Synthesis of Copolymer B-18

Copolymer B-18 having a weight-average molecular weight of 70,000 was obtained as in Copolymer B-1 except that the amounts of Phosmer M, diacetone acrylamide, and vinylnaphthalene added were changed to 80 parts, 15 parts, and 5 parts, respectively, the temperature was increased to 50° C., and the polymerization time was changed to 48 hours.

Synthesis of Copolymer B-19

In a flask equipped with a stirrer, a thermometer, and a nitrogen-introducing tube, 500 parts of 1-methoxy-2-propanol serving as a solvent, 30 parts of Phosmer M represented by Formula 5-1 below, 70 parts of styrene, and 4 parts of azobisisobutyronitrile serving as a polymerization initiator were put. The temperature was then increased to 65° C., and polymerization was conducted for 5 hours in a nitrogen stream. Next, about half of the solvent was distilled off, and the resulting reaction mixture was then poured into a large amount of methanol to precipitate Copolymer B-19. The precipitated Copolymer B-19 was further dried. Copolymer B-19 had a weight-average molecular weight of 7,000.

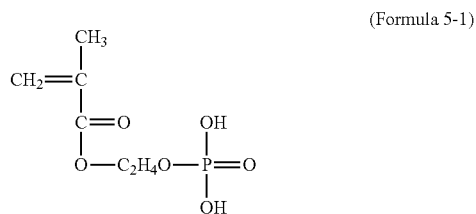

(Formula 5-1)

Characteristics of Copolymers B-1 to B-19 are shown in Table 3.

Weight-average Molecular Weight

The weight-average molecular weight was measured by gel permeation chromatography (GPC) using a column oven CTO-20A (manufactured by Shimadzu Corporation), a detector RID-10A (manufactured by Shimadzu Corporation), an eluent flow path pump LC-20AD (manufactured by Shimadzu Corporation), a degasser DGU-20A (manufactured by Shimadzu Corporation), and an autosampler SIL-20A (manufactured by Shimadzu Corporation). A TSKgel G3000PWXL size exclusion chromatography (SEC) column for aqueous solvents, the column having an exclusion limit molecular weight of $2\times10^5$, a TSKgel G5000PWXL column having an exclusion limit molecular weight of $2.5\times10^6$, and a TSKgel G6000PWXL column having an exclusion limit molecular weight of $5\times10^7$, (all of which are manufactured by Tosoh Corporation) were connected to each other and used as columns. A sample prepared by diluting with an eluent so as to have a concentration of 2 g/100 mL was used. An aqueous solution containing 0.5 mol/L of acetic acid and 0.5 mol/L of sodium acetate was used as the eluent. The column temperature was 40° C., and the flow rate was 1.0 mL/min. A calibration curve was prepared by using nine types of polyethylene glycol standard samples having molecular weights of 1,065, 5,050, 24,000, 50,000, 107,000, 140,000, 250,000, 540,000, and 920,000.

TABLE 3

| Copolymer | Compounds constituting copolymer B- | | | Component ratio of copolymer B- | | | Molecular weight |
|---|---|---|---|---|---|---|---|
| | Structure 1 | Structure 2 | Structure 3 | Structure 1 Content | Structure 2 Content | Structure 3 Content | |
| Copolymer B-1 | Formula 5-1 (Phosmer M) | Diacetone acrylamide | Vinylnaphthalene | 30 | 10 | 60 | 30,000 |
| Copolymer B-2 | Formula 5-2 (P-1A) | Diacetone acrylamide | Vinylnaphthalene | 30 | 10 | 60 | 31,000 |
| Copolymer B-3 | Formula 5-3 (Phosmer PE) | Diacetone acrylamide | Vinylnaphthalene | 30 | 10 | 60 | 32,000 |
| Copolymer B-4 | Formula 5-4 (Phosmer PP) | Diacetone acrylamide | Vinylnaphthalene | 30 | 10 | 60 | 32,000 |
| Copolymer B-5 | Formula 5-5 | Diacetone acrylamide | Vinylnaphthalene | 30 | 10 | 60 | 31,000 |
| Copolymer B-6 | Formula 5-1 (Phosmer M) | Diacetone methacrylamide | Vinylnaphthalene | 30 | 10 | 60 | 29,000 |
| Copolymer B-7 | Formula 5-1 (Phosmer M) | Diacetone acrylamide | Vinylnaphthalene | 5 | 5 | 90 | 32,000 |
| Copolymer B-8 | Formula 5-1 (Phosmer M) | Diacetone acrylamide | Vinylnaphthalene | 10 | 10 | 80 | 31,000 |
| Copolymer B-9 | Formula 5-1 (Phosmer M) | Diacetone acrylamide | Vinylnaphthalene | 60 | 30 | 10 | 30,000 |
| Copolymer B-10 | Formula 5-1 (Phosmer M) | Diacetone acrylamide | Vinylnaphthalene | 80 | 15 | 5 | 29,000 |
| Copolymer B-11 | Formula 5-1 (Phosmer M) | Diacetone acrylamide | Vinylnaphthalene | 30 | 10 | 60 | 3,000 |
| Copolymer B-12 | Formula 5-1 (Phosmer M) | Diacetone acrylamide | Vinylnaphthalene | 30 | 10 | 60 | 5,100 |
| Copolymer B-13 | Formula 5-1 (Phosmer M) | Diacetone acrylamide | Vinylnaphthalene | 30 | 10 | 60 | 49,000 |
| Copolymer B-14 | Formula 5-1 (Phosmer M) | Diacetone acrylamide | Vinylnaphthalene | 30 | 10 | 60 | 70,000 |
| Copolymer B-15 | Formula 5-1 (Phosmer M) | Diacetone acrylamide | Vinylnaphthalene | 5 | 5 | 90 | 3,100 |
| Copolymer B-16 | Formula 5-1 (Phosmer M) | Diacetone acrylamide | Vinylnaphthalene | 5 | 5 | 90 | 72,000 |
| Copolymer B-17 | Formula 5-1 (Phosmer M) | Diacetone acrylamide | Vinylnaphthalene | 80 | 15 | 5 | 3,000 |
| Copolymer B-18 | Formula 5-1 (Phosmer M) | Diacetone acrylamide | Vinylnaphthalene | 80 | 15 | 5 | 70,000 |
| Copolymer B-19 | Formula 5-1 (Phosmer M) | — | Styrene | 30 | — | 70 | 7,000 |

Example B-1

First, 10 g of Copolymer B-1 and 80 g of water were mixed, and the mixture was then neutralized by adding a 10% by weight aqueous potassium hydroxide solution dropwise to the mixture so that the neutralization ratio became 100%. Next, the resulting mixture was diluted with water to prepare a 10% by weight aqueous solution of a potassium salt of Copolymer B-1.

Subsequently, 20 parts of carbon black NIPEX 150 (manufactured by Degussa), 50 parts of the 10% by weight aqueous solution of the potassium salt of Copolymer B-1, and 30 parts of pure water were mixed. The resulting mixture was then dispersed at a peripheral speed of 10 m/s for 10 minutes while being circulated using a disc-type bead mill KDL (manufactured by Shinmaru Enterprises Corporation). In this step, zirconia balls having a diameter of 0.1 mm were used as media. Next, the resulting dispersion was filtered with a membrane filter having a pore size of 1.2 μm, and then diluted with water. Thus, a pigment dispersion having a concentration of 20% by mass was prepared.

Next, 40 parts of the 20% by weight pigment dispersion, 20 parts of 1,3-butanediol serving as a humectant. 10 parts of glycerin serving as a humectant, I part of 2-ethyl-1,3-hexanediol serving as a penetrant, 1 part of 2,2,4-trimethyl-1,3-pentanediol serving as a penetrant, 2 parts of 40% by weight fluorine-based surfactant Zonyl FS-300 (manufactured by Dupont), and 26 parts of distilled water were mixed, and the resulting mixture was then stirred for 1.5 hours. Next, the mixture was filtered with a membrane filter having a pore size of 1.2 μm. Thus, an inkjet ink was obtained.

The inkjet ink was charged into an inkjet printer IPSiO GX5000 (manufactured by Ricoh Company, Ltd.). Printing was performed on plain paper 1 (XEROX 4200, manufactured by Xerox Corporation, having a calcium carbonate content of about 16% by mass) and plain paper 2 (My Paper, manufactured by Ricoh Company, Ltd., having a calcium carbonate content of about 4% by mass) as described below. Thus, printed matter on which the above-prepared inkjet ink was printed was obtained.

Example B-2

An inkjet ink and printed matter were obtained as in Example B-1 except that carbon black NIPEX 150 (manufactured by Degussa) was replaced by Pigment Blue 15:3 (manufactured by Dainichiseika Color & Chemicals Mfg. Co., Ltd., Chromofine Blue, cyan pigment).

Example B-3

An inkjet ink and printed matter were obtained as in Example B-1 except that carbon black NIPEX 150 (manufactured by Degussa) was replaced by Pigment Red 122 (manufactured by Clariant, Toner magenta EO02, magenta pigment).

Example B-4

An inkjet ink and printed matter were obtained as in Example B-1 except that carbon black NIPEX 150 (manufactured by Degussa) was replaced by Pigment Yellow (manufactured by Dainichiseika Color & Chemicals Mfg. Co., Ltd., Fast Yellow 531, yellow pigment).

Example B-5

An inkjet ink and printed matter were obtained as in Example B-1 except that Copolymer B-1 was replaced by Copolymer B-2.

Example B-6

An inkjet ink and printed matter were obtained as in Example B-1 except that Copolymer B-1 was replaced by Copolymer B-3.

Example B-7

An inkjet ink and printed matter were obtained as in Example B-1 except that Copolymer B-1 was replaced by Copolymer B-4.

Example B-8

An inkjet ink and printed matter were obtained as in Example B-1 except that Copolymer B-1 was replaced by Copolymer B-5.

Example B-9

An inkjet ink and printed matter were obtained as in Example B-1 except that Copolymer B-1 was replaced by Copolymer B-6.

Example B-10

An inkjet ink and printed matter were obtained as in Example B-1 except that the 10% by weight aqueous potassium hydroxide solution was replaced by a 10% by weight aqueous lithium hydroxide solution, and an aqueous solution of a lithium salt of Copolymer B-1 was used.

Example B-11

An inkjet ink and printed matter were obtained as in Example B-1 except that the 10% by weight aqueous potassium hydroxide solution was replaced by a 10% by weight aqueous solution of dimethylaminoethanolamine, and an aqueous solution of a dimethylaminoethanolamine salt of Copolymer B-1 was used.

Example B-12

An inkjet ink and printed matter were obtained as in Example B-1 except that the 10% by weight aqueous potassium hydroxide solution was used and the neutralization ratio was controlled to 50%.

Example B-13

An inkjet ink and printed matter were obtained as in Example B-1 except that Copolymer B-1 was replaced by Copolymer B-7.

Example B-14

An inkjet ink and printed matter were obtained as in Example B-1 except that Copolymer B-1 was replaced by Copolymer B-8.

Example B-15

An inkjet ink and printed matter were obtained as in Example B-1 except that Copolymer B-1 was replaced by Copolymer B-9.

Example B-16

An inkjet ink and printed matter were obtained as in Example B-1 except that Copolymer B-1 was replaced by Copolymer B-10.

Example B-17

An inkjet ink and printed matter were obtained as in Example B-1 except that Copolymer B-1 was replaced by Copolymer B-11.

Example B-18

An inkjet ink and printed matter were obtained as in Example B-1 except that Copolymer B-1 was replaced by Copolymer B-12.

Example B-19

An inkjet ink and printed matter were obtained as in Example B-1 except that Copolymer B-1 was replaced by Copolymer B-13.

Example B-20

An inkjet ink and printed matter were obtained as in Example B-1 except that Copolymer B-1 was replaced by Copolymer B-14.

Example B-21

An inkjet ink and printed matter were obtained as in Example B-1 except that Copolymer B-1 was replaced by Copolymer B-15.

Example B-22

An inkjet ink and printed matter were obtained as in Example B-1 except that Copolymer B-1 was replaced by Copolymer B-16.

Example B-23

An inkjet ink and printed matter were obtained as in Example B-1 except that Copolymer B-1 was replaced by Copolymer B-17.

Example B-24

An inkjet ink and printed matter were obtained as in Example B-1 except that Copolymer B-1 was replaced by Copolymer B-18.

Comparative Example B-1

An inkjet ink and printed matter were obtained as in Example B-1 except that Copolymer B-1 was replaced by Copolymer B-19.

The image density and storage stability of each of the inkjet inks of Examples B-1 to B-24 and Comparative Example B-1 were evaluated.

Image Density on Plain Paper

In an environment at 23° C. and 50% RH, an inkjet ink was charged into an inkjet printer IPSiO GX5000 (manufactured by Ricoh Company, Ltd.). Next, a chart of the general character (size: 64 points) of JIS X 0208 (1997), 2223 formed by using Microsoft Word 2000 (manufactured by Microsoft Corporation) was printed on plain paper 1 (XEROX 4200, manufactured by Xerox Corporation, having a calcium carbonate content of about 16% by mass) and plain paper 2 (My Paper, manufactured by Ricoh Company, Ltd., having a calcium carbonate content of about 4% by mass). Subsequently, the image density of the general symbols was measured with X-Rite 938 (manufactured by Romix Corporation). In this test, by the user settings for plain paper, the "plain paper-standard quick" mode was changed to "without color correction" by using a driver attached to the inkjet printer, and this new mode was used as a printing mode.

In the case of a black ink, the evaluation was performed by the following criteria. When the image density was 1.25 or more, the sample was evaluated as "A". When the image density was 1.20 or more and less than 1.25, the sample was evaluated as "B". When the image density was 1.10 or more and less than 1.20, the sample was evaluated as "C". When the image density was less than 1.10, the sample was evaluated as "D". When the image density was less than 1.00 or the evaluation could not be performed due to gelation of the black ink, the sample was evaluated as "E".

In the case of a yellow ink, the evaluation was performed by the following criteria. When the image density was 0.75 or more, the sample was evaluated as "B". When the image density was 0.70 or more and less than 0.75, the sample was evaluated as "C". When the image density was 0.65 or more and less than 0.70, the sample was evaluated as "D". When the image density was less than 0.65 or the evaluation could not be performed due to gelation of the yellow ink, the sample was evaluated as "E".

In the case of a magenta ink, the evaluation was performed by the following criteria. When the image density was 0.90 or more, the sample was evaluated as "B". When the image density was 0.80 or more and less than 0.90, the sample was evaluated as "C". When the image density was 0.70 or more and less than 0.80, the sample was evaluated as "D". When the image density was less than 0.70 or the evaluation could not be performed due to gelation of the magenta ink, the sample was evaluated as "E".

In the case of a cyan ink, the evaluation was performed by the following criteria. When the image density was 1.00 or more, the sample was evaluated as "B". When the image density was 0.90 or more and less than 1.00, the sample was evaluated as "C". When the image density was 0.80 or more and less than 0.90, the sample was evaluated as "D". When the image density was less than 0.80 or the evaluation could not be performed due to gelation of the cyan ink, the sample was evaluated as "E".

Storage Stability

An inkjet ink was charged into an ink cartridge and stored at 60° C. for two weeks. A ratio of change in viscosity was determined by calculating a ratio of a viscosity after storage to a viscosity before storage. When the absolute value of the ratio of change in viscosity was less than 5%, the sample was evaluated as "A". When the absolute value of the ratio of change in viscosity was 5% or more and less than 8%, the sample was evaluated as "B". When the absolute value of the ratio of change in viscosity was 8% or more and less than 10%, the sample was evaluated as "C". When the absolute value of the ratio of change in viscosity was 10% or more and less than 30%, the sample was evaluated as "D". When the absolute value of the ratio of change in viscosity was 30% or more or the evaluation could not be performed due to gelation of the inkjet ink, the sample was evaluated as "E".

Table 4 shows the evaluation results of the image density and storage stability of the inkjet inks of Examples B-1 to B-24 and Comparative Example B-1.

TABLE 4

|  | Pigment used | Copolymer | Counter ion | Neutralization ratio (%) of M in Formula 1 | Effects Image density Plain paper 1 | Plain paper 2 | Storage stability |
|---|---|---|---|---|---|---|---|
| Example B-1 | Carbon black | Copolymer B-1 | K | 100 | A | B | A |
| Example B-2 | Cyan pigment | Copolymer B-1 | K | 100 | B | C | A |
| Example B-3 | Magenta pigment | Copolymer B-1 | K | 100 | B | C | A |
| Example B-4 | Yellow pigment | Copolymer B-1 | K | 100 | B | C | A |
| Example B-5 | Carbon black | Copolymer B-2 | K | 100 | A | B | B |
| Example B-6 | Carbon black | Copolymer B-3 | K | 100 | A | B | B |
| Example B-7 | Carbon black | Copolymer B-4 | K | 100 | A | B | B |
| Example B-8 | Carbon black | Copolymer B-5 | K | 100 | B | B | B |
| Example B-9 | Carbon black | Copolymer B-6 | K | 100 | A | B | A |
| Example B-10 | Carbon black | Copolymer B-1 | Li | 100 | A | B | A |
| Example B-11 | Carbon black | Copolymer B-1 | DMEA | 100 | A | B | A |
| Example B-12 | Carbon black | Copolymer B-1 | K/H | 50 | A | B | A |
| Example B-13 | Carbon black | Copolymer B-7 | K | 100 | B | B | A |
| Example B-14 | Carbon black | Copolymer B-8 | K | 100 | A | B | A |
| Example B-15 | Carbon black | Copolymer B-9 | K | 100 | A | B | A |
| Example B-16 | Carbon black | Copolymer B-10 | K | 100 | A | B | B |
| Example B-17 | Carbon black | Copolymer B-11 | K | 100 | B | B | B |
| Example B-18 | Carbon black | Copolymer B-12 | K | 100 | A | B | A |
| Example B-19 | Carbon black | Copolymer B-13 | K | 100 | A | B | A |
| Example B-20 | Carbon black | Copolymer B-14 | K | 100 | A | B | B |
| Example B-21 | Carbon black | Copolymer B-15 | K | 100 | B | C | C |
| Example B-22 | Carbon black | Copolymer B-16 | K | 100 | B | C | C |
| Example B-23 | Carbon black | Copolymer B-17 | K | 100 | B | B | C |
| Example B-24 | Carbon black | Copolymer B-18 | K | 100 | B | B | C |
| Comparative Example B-1 | Carbon black | Copolymer B-19 | K | 100 | C | D | D |

Table 4 shows that the inkjet inks of Examples B-1 to B-24 have good image densities on plain paper and good storage stability.

In contrast, the inkjet ink of Comparative Example B-1 has low storage stability because the inkjet ink contains a potassium salt of Copolymer B-19, which has a structural unit derived from styrene.

According to the present invention, an inkjet ink having a good image density on plain paper and good storage stability can be provided.

Having now fully described embodiments of the present invention, it will be apparent to one of ordinary skill in the art that many changes and modifications can be made thereto without departing from the spirit and scope of embodiments of the invention as set forth herein.

What is claimed is:

1. An inkjet ink comprising:
water;
a water-soluble organic solvent;
a pigment; and
a copolymer or a salt thereof,
wherein the copolymer or the salt thereof has at least a structural unit represented by Formula 1, a structural unit represented by Formula 2, and a structural unit represented by Formula 3 or 4:

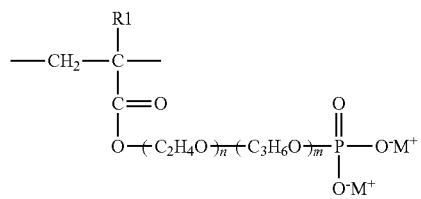
(Formula 1)

where, in Formula 1, R1 represents a methyl group or a hydrogen atom, $M^+$s each represent a hydrogen ion, an alkali metal ion, or an organic ammonium ion, and m and n each, independently represent 0 or an integer of from 1 to 6 excluding a case of both m and n being 0 at the same time,

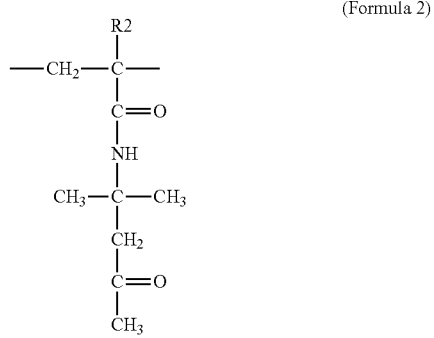
(Formula 2)

where, in Formula 2, R2 represents a methyl group or a hydrogen atom,

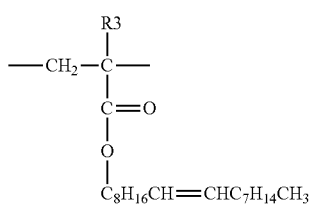
(Formula 3)

where, in Formula 3, R3 represents a methyl group or a hydrogen atom

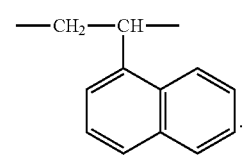
(Formula 4)

2. The inkjet ink according to claim 1, wherein the salt of the copolymer is synthesized by copolymerizing monomers comprising a compound represented by Formula 5, a compound represented by Formula 6, and a compound represented by Formula 7 or 8 to produce the copolymer, and subsequently neutralizing the copolymer with an alkali metal base or an organic amine base:

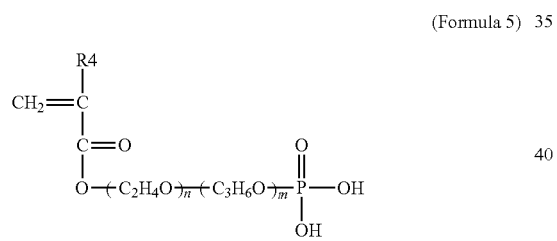
(Formula 5)

where, in Formula 5, R4 represents a methyl group or a hydrogen atom, and m and n each, independently, represent 0 or an integer of from 1 to 6 excluding a case of both m and n being 0 at the same time,

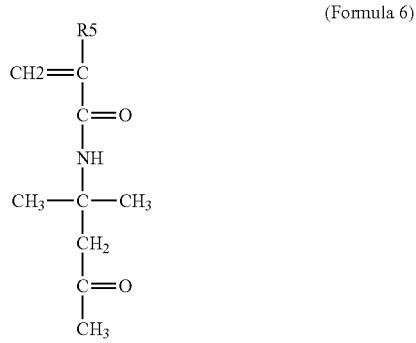
(Formula 6)

where, in Formula 6, R5 represents a methyl group or a hydrogen atom,

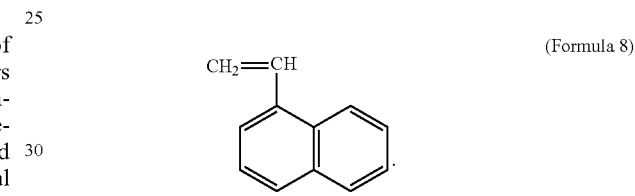
(Formula 7)

where, in Formula 7, R6 represents a methyl group or a hydrogen atom (Formula 8)

3. The inkjet ink according to claim 1, wherein the copolymer or the salt thereof contains the structural unit represented by Formula 1 in an amount of 10% by mass or more and 60% by mass or less.

4. The inkjet ink according to claim 1, wherein the copolymer has a weight-average molecular weight of from 5,000 to 50,000.

5. An ink storage container comprising:
   an ink; and
   an ink storage portion that stores the ink,
   wherein the ink stored in the ink storage portion is the inkjet ink of claim 1.

6. An inkjet recording apparatus comprising:
   an inkjet head to record an image on a recording medium by ejecting ink,
   wherein the ink is the inkjet ink of claim 1.

7. Recorded matter comprising:
   an image; and
   a recording medium on which the image is recorded by using an ink,
   wherein the ink is the inkjet ink of claim 1.

* * * * *